(12) United States Patent
Bai et al.

(10) Patent No.: US 8,174,925 B2
(45) Date of Patent: May 8, 2012

(54) ACOUSTIC CAMERA

(75) Inventors: Mingsian R. Bai, Hsinchu (TW);
Jia-Hong Lin, Taoyuan County (TW);
Kuan-Liang Liu, Taipei County (TW)

(73) Assignee: National Chiao Tung University,
Hsinchu (TW)

( * ) Notice: Subject to any disclaimer, the term of this patent is extended or adjusted under 35 U.S.C. 154(b) by 413 days.

(21) Appl. No.: 12/586,303

(22) Filed: Sep. 19, 2009

(65) Prior Publication Data

US 2010/0272286 A1 Oct. 28, 2010

(30) Foreign Application Priority Data

Apr. 27, 2009 (TW) ............................. 98113951 A

(51) Int. Cl.
*G03B 42/06* (2006.01)
(52) U.S. Cl. ................. 367/7; 367/8; 381/122; 381/123
(58) Field of Classification Search .................. 367/7, 8, 367/11, 87, 88; 381/92, 122, 123; 73/603, 73/606; 702/94, 150; 600/443
See application file for complete search history.

(56) References Cited

U.S. PATENT DOCUMENTS

| 6,671,227 B2* | 12/2003 | Gilbert et al. .................. 367/138 |
| 7,711,127 B2* | 5/2010 | Suzuki et al. .................... 381/92 |
| 2007/0195646 A1* | 8/2007 | Govindswamy et al. ....... 367/88 |
| 2008/0034869 A1* | 2/2008 | Heinz et al. ...................... 73/572 |
| 2008/0228433 A1* | 9/2008 | Meyer et al. .................. 702/150 |
| 2011/0019835 A1* | 1/2011 | Schmidt et al. ............ 381/71.11 |

OTHER PUBLICATIONS

Trucco, "Thinning and Weighting of Large Planar Arrays by Simulated Annealing," IEEE Trasactions on Ultrasonic, Ferroelectrics, and Frequency Control, vol. 46, No. 2, Mar. 1999, pp. 347-355.
Rowell et al., "Determination of the Directivity of a Planar Noise Source by Means of Near Field Acoustical Holography, 2: Numerical Simulation," Journal of Sound and Vibration, vol. 180, No. 1, 1995, 119-142.
Yoon et al., "Estimation of Acoustic Source Strength by Inverse Methods: Part II, Experimental Investigation of Methods for Choosing Regularization Parameters," Journal of Sound and Vibration, vol. 233 No. 4, 2000, pp. 669-705.
Schuhmacher et al., "Sound source reconstruction using inverse boundary element calculations," J. Accoust. Soc. Am., vol. 113, No. 1, Jan. 2003, pp. 114-127.
Murino et al., "Synthesis of Unequally Spaced Arrays by Simulated Annealing," IEEE Transactions on Signal Processing, vol. 44, No. 1, Jan. 1996, pp. 119-123.

(Continued)

*Primary Examiner* — Xu Mei
*Assistant Examiner* — Friedrich W Fahnert
(74) *Attorney, Agent, or Firm* — Muncy, Geissler, Olds & Lowe, PLLC

(57) ABSTRACT

An acoustic camera comprises a first sound pick-up device, a second sound pick-up device, and a switch. The switch is respectively connected to the first sound pick-up device and the second pick-up device and used to select the first sound pick-up device or the second sound pick-up device to reconstruct the sound field of the sound source of a detected object. The first sound pick-up device has a first microphone array, and the first microphone array is a near-field uniform microphone array. The second sound pick-up device has a second microphone array, and the second microphone array is a far-field non-uniform microphone array.

11 Claims, 31 Drawing Sheets
(13 of 31 Drawing Sheet(s) Filed in Color)

OTHER PUBLICATIONS

Hald, "Non-stationary STSF," Bruel & Kjaer Technical Review, No. 1-2000, Bruel & Kjaer Sound & Vibration Measurement A/S, Denmark, 2000.

Christensen et al., "Beamforming," Bruel & Kjaer Technical Review, No. 1-2004, Bruel & Kjaer Sound & Vibration Measurement A/S, Denmark, 2004.

* cited by examiner

ACOUSTIC CAMERA

FIELD OF THE INVENTION

The present invention relates to an acoustic camera, particularly to an acoustic camera using an optimal-deployment microphone array to pick up the sound source of a detected object.

DESCRIPTION OF THE RELATED ART

Vibration is an important research field and has developed for a long time. There are numerous researches about the related subjects, including vibration analysis, damping analysis, vibration control, and dynamic simulation. The current industry has a tendency toward high speed and high precision, and structural vibration thus becomes a more and more important problem.

With the persistent advance of science and technology, people demand higher and higher living quality. However, all day long and all year round, the living environment is full of structural vibration-induced noise, which harms the physical and psychic health of people.

The acoustic camera can effectively assist engineers to position a noise source or an abnormal sound source (e.g. vibration of an engine or turbine) in many fields, including the automobile, machine, computer, and consumer electronic industries. Therefore, the acoustic camera can benefit product development very much in noise diagnosis.

There have been many prior arts of the acoustic camera. A US patent of application No. US2005/0225497A1 disclosed a "Beam Forming Array of Transducers", which identifies a far-field sound field with a beam forming array. However, the prior art does not provide a wave-number-domain beam pattern or an optimization method to prove that the microphones thereof have the best deployment.

A U.S. Pat. No. 6,760,449B1 disclosed a "Microphone Array System", which identifies a sound field with a microphone array according to the delay-and-sum method, and which features the same as the abovementioned US patent of application No. US2005/0225497A1. However, the U.S. Pat. No. 6,760,449B1 has a grating-lobe problem at high frequency, which is a result of lacking microphone deployment optimization.

A U.S. Pat. No. 6,958,950B2 disclosed a "Method of Visualizing Sound Fields of Individual Sound Source Using Acoustic Holography", which uses the acoustic holography to identify the planar distribution of sound fields. However, the U.S. Pat. No. 6,958,950B2 is only realized in the frequency domain. Thus, the prior art is unlikely to identify a sound field in realtime (unlikely to position a noise source in realtime).

A U.S. Pat. No. 5,712,805 disclosed a "Noise Diagnostic System", which uses independent equations to solve the Helmholtz equation and attain the sound field distribution of an engine. However, the U.S. Pat. No. 5,712,805 has a great error when applied to a planar noise source. Besides, the prior art also has a disadvantage of needing a lot of microphones.

A US patent No. US2007/0189550A1 disclosed a "Panel Acoustic Contributions Examination", which uses Helmholtz equation least squares to identify planar sound field distribution. However, the US patent No. US2007/0189550A1 has the same disadvantage as the U.S. Pat. No. 6,958,950B2—needing a lot of microphones.

Accordingly, the present invention proposes an acoustic camera to overcome the abovementioned problems.

SUMMARY OF THE INVENTION

The primary objective of the present invention provide an acoustic camera, which proposes optimized deployments of microphone arrays, whereby the acoustic camera can generate a beam pattern having fine main lobes, few side lobes and none grating lobe when reconstructing the sound field of the sound source of a detected object.

Another objective of the present invention provide an acoustic camera, which has two sets of microphone arrays, where a switch is used to shift the near-field mode and the far-field mode, whereby the acoustic camera can effectively obtain the sound field imaging of a noise source.

A further objective of the present invention provide an acoustic camera, which uses a delay-and-sum module and an acoustic inverse computation module to process sound field imaging, whereby the present invention can effectively reduce the amount of calculation and can position a noise source in realtime.

The present invention proposes an acoustic camera, which comprises a first sound pick-up device, a second sound pick-up device and a switch, where the switch respectively connects with the first sound pick-up device and the second sound pick-up device. The switch is used to select the first sound pick-up device or the second sound pick-up device to reconstruct the sound field of a detected object. The first sound pick-up device has a first microphone array, which is a uniform microphone array for a near-field sound field. The second sound pick-up device has a second microphone array, which is a non-uniform microphone array for a far-field sound field. The acoustic camera of the present invention adopts a delay-and-sum module, an acoustic inverse computation module and an acoustic post-processor to reconstruct the image of a sound field, whereby the present invention can effectively reduce the amount of calculation and can position a noise source in realtime. As the present invention optimizes the deployments of the first microphone array and second microphone array, the sound field imaging, which is undertaken by the delay-and-sum module, acoustic inverse computation module and acoustic post-processor, can achieve the best sound field identification. The acoustic camera of the present invention has two sets of microphone arrays, and a switch is used to shift the near-field sound field mode and the far-field sound field mode, whereby the present invention can effectively attain the sound field imaging of a noise source. The present invention provides the optimized deployments for the near-field and far-field microphone arrays, whereby the acoustic camera of the present invention has fine main lobes, few side lobes and none grating lobe when reconstructing the sound field of the sound source of a detected object.

Below, the embodiments are described in detail in cooperation with the attached drawings to make easily understood the objectives, technical contents, characteristics and accomplishments of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1A:
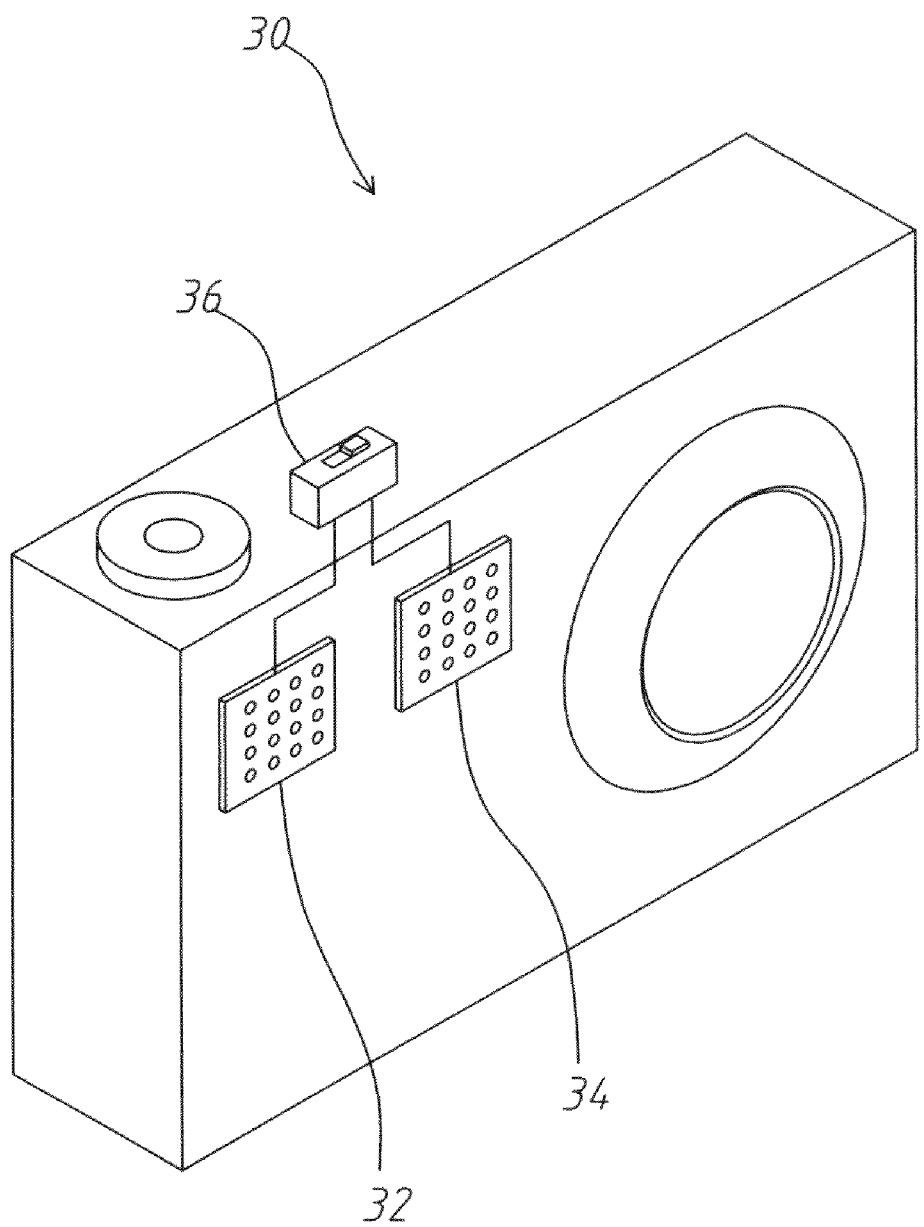
FIG. 1a is a perspective view schematically showing an acoustic camera according to the present invention.
Figure 1B:
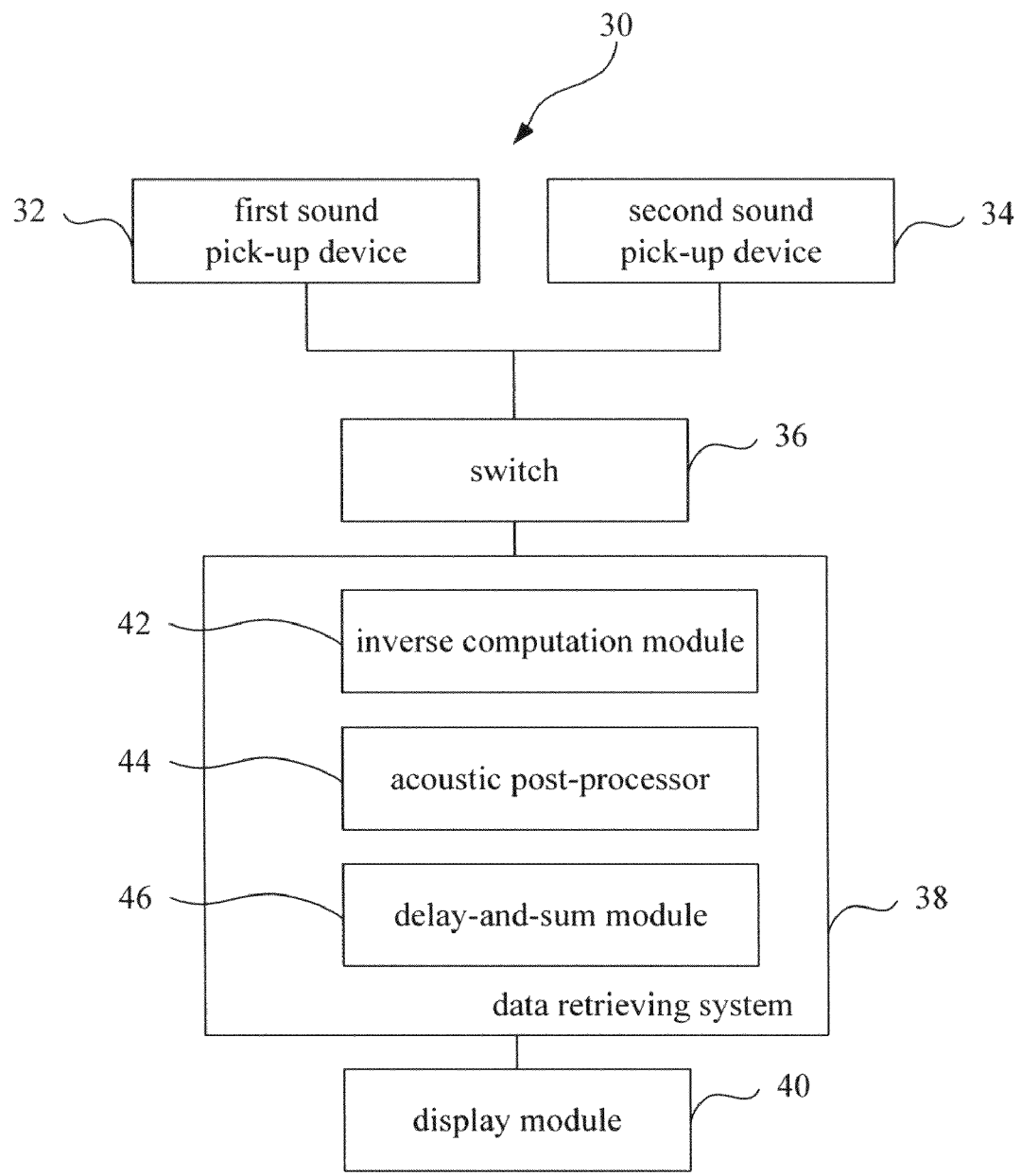
FIG. 1b is a block diagram schematically showing the architecture of an acoustic camera according to the present invention.
Figure 1C:
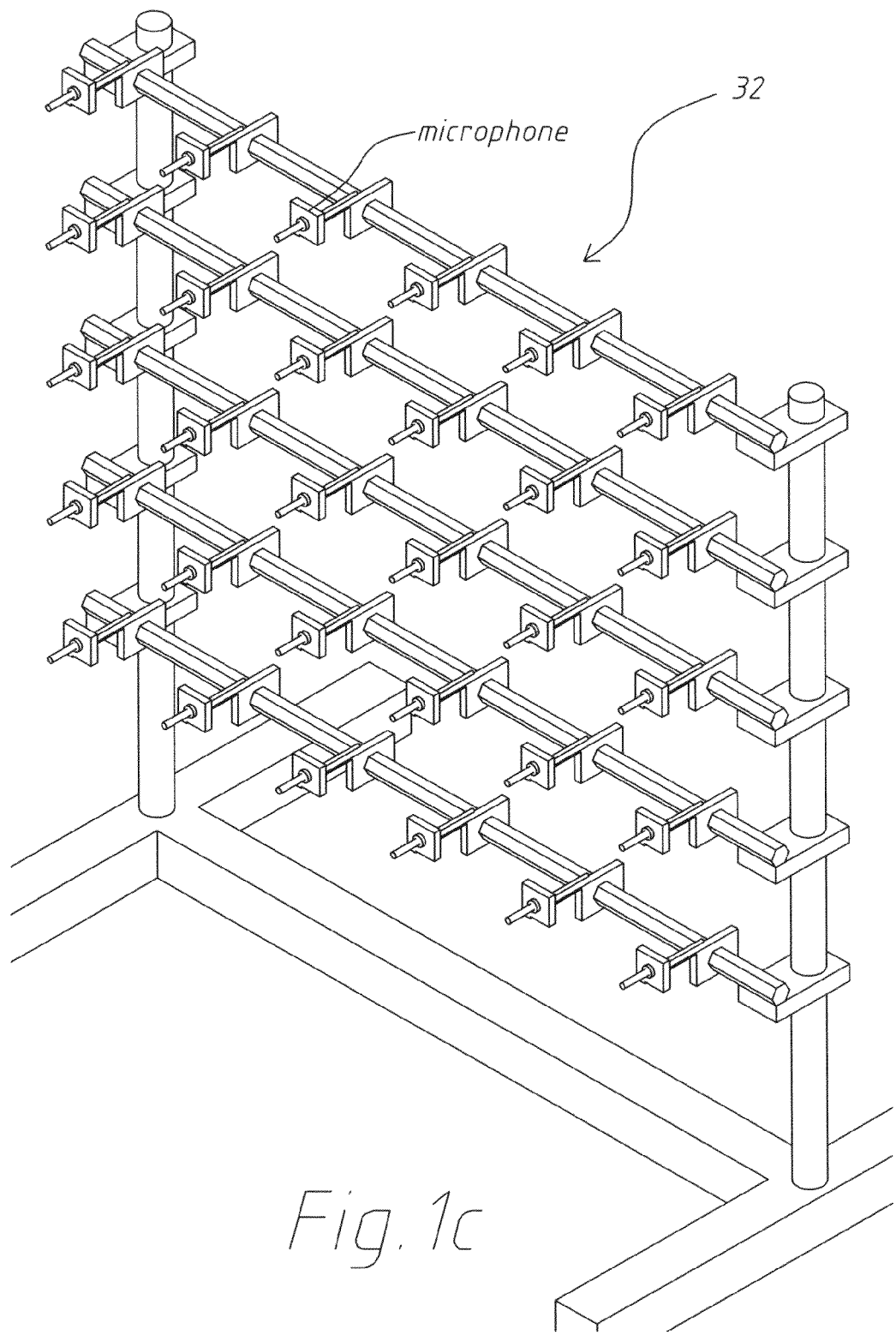
FIGS. 1c-1d are diagrams respectively schematically showing a first microphone array and a second microphone array of an acoustic camera according to the present invention.
Figure 1D:
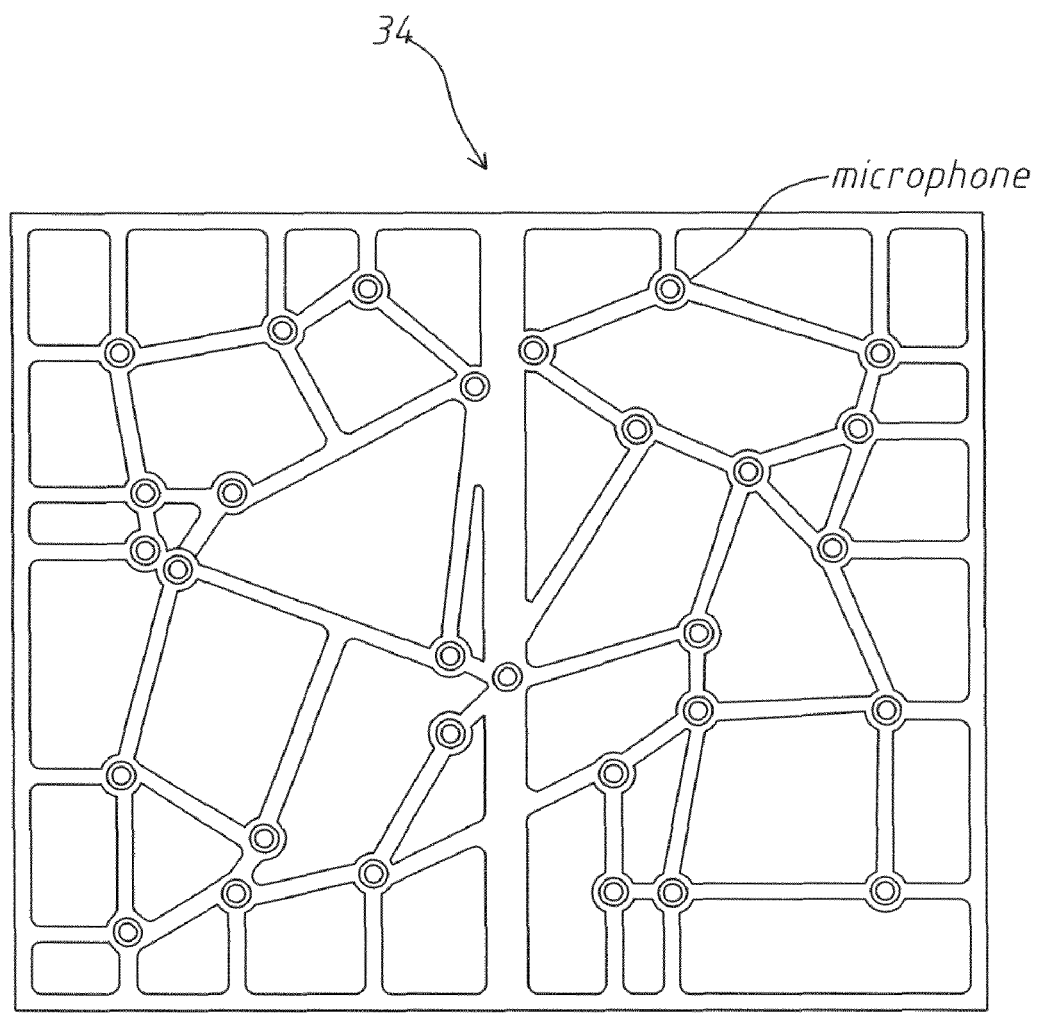

Refer to From FIG. 1a to FIG. 1d. One embodiment of the present invention proposes an acoustic camera 30 comprising a first sound pick-up device 32, a second sound pick-up device 34, a switch 36, a data retrieving system 38, and a display module 40. The first sound pick-up device 32 and the second sound pick-up device 34 are installed in the acoustic camera 30. In this embodiment, the first sound pick-up device 32 is a first microphone array containing a plurality of microphones, and the second sound pick-up device 34 is a second microphone array containing a plurality of microphones.

The switch 36 respectively connects with the first sound pick-up device 32 and the second sound pick-up device 34. The switch 36 is of a manual/mechanical type, a semi-automatic/electronic type, or an automatic/electronic type. The manual/mechanical type switch 36 is manually operated to select the first sound pick-up device 32 or the second sound pick-up device 34 to pick up the sound source of a detected object. The semi-automatic/electronic type switch 36 can be chosen to be manually or automatically operated to select the first sound pick-up device 32 or the second sound pick-up device 34 to pick up the sound source of a detected object. For the automatic/electronic type switch 36, the acoustic camera 30 can automatically determine whether the automatic/electronic type switch 36 should select the first sound pick-up device 32 or the second sound pick-up device 34 to pick up the sound source of a detected object.

The automatic-switching mechanism of the acoustic camera 30 includes the following steps: using the microphones to pick up the sound field of a detected object; the acoustic camera 30 identifying whether the sound field of the detected object is of a spherical wave or a plane wave; if the sound field is of a spherical wave, the acoustic camera 30 determining that the sound field is a near-field sound field, and selecting the first sound pick-up device 32 to capture image; if the sound field is of a plane wave, the acoustic camera 30 determining that the sound field is a far-field sound field, and selecting the second sound pick-up device 34 to capture image. Alternatively, the acoustic camera 30 may present the identification result on the display module 40, and the user can select the first sound pick-up device 32 or the second sound pick-up device 34 according to the identification result.

Below are demonstrated the far-field sound field reconstruction technology and the near-field sound field reconstruction technology of the present invention. In this embodiment, the first sound pick-up device 32 (the first microphone array) is used in the near-field mode, and the second sound pick-up device 34 (the second microphone array) is used in the far-field mode. It should be noted that the optimal microphone deployment for the near-field sound field reconstruction technology is different from that for the far-field sound field reconstruction technology. In other words, an error may appear if the first sound pick-up device 32 (for a near-field sound field) is used to pick up the sound field of a far-field noise source. Below is described the difference between the first microphone array and the second microphone array and explained why they are different.

Firstly is described the far-field acoustic camera technology of the present invention.

After the second sound pick-up device 34 picks up the sound source of a detected object, the sound field is output to the data retrieving system 38. A delay-and-sum module 46 of the data retrieving system 38 is used to obtain the strength of the sound source of the detected object. Then, the result output by the delay-and-sum module 46 is presented on the display module 40, where the display module 40 may be a display screen.

The far-field acoustic camera technology of the present invention is suitable to a larger-area noise source. The far-field acoustic camera 30 uses the delay-and-sum module 46 and the method thereof to calculate the strength distribution image of the sound source inside an assigned scan area. The far-field acoustic camera technology of the present invention assumes that the plane wave generated by a larger-area noise source is transmitted from a far field to the microphone array.

Figure 2:
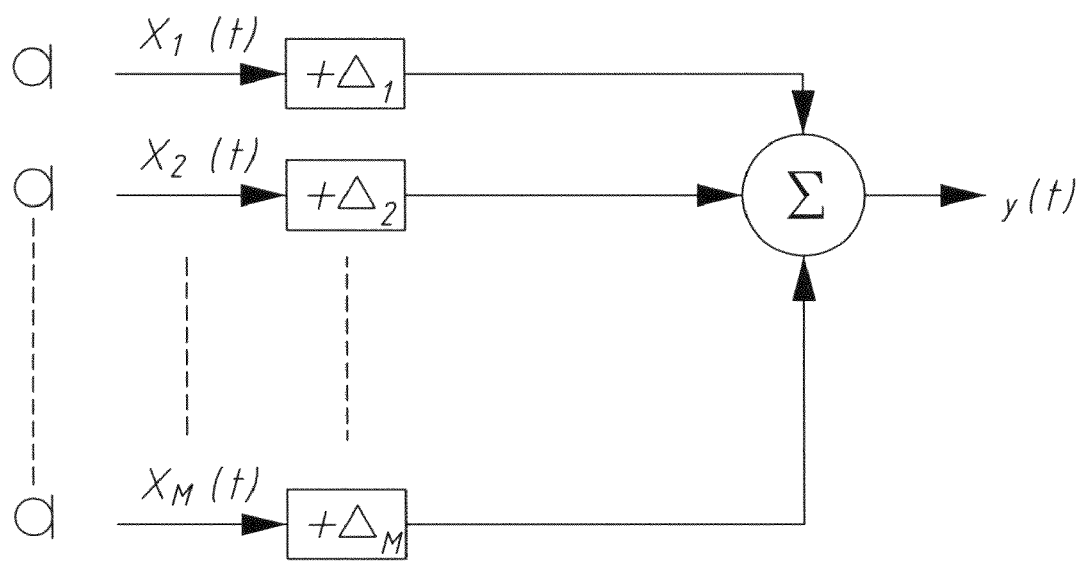
FIG. 2 is a diagram schematically showing the delay-and-sum method used in the present invention.

Refer to FIG. 2 for the delay-and-sum method used in the present invention. The acoustic signals of the sound source picked up by the microphones are appropriately delayed in time simultaneously and then summed up to generate an output signal y (t, θ), which is expressed by Equation 1

$$y(t, \theta) = \sum_{m=1}^{M} x_m(t + \Delta_m) \quad (1)$$

where $x_m(t)$ is the time-domain signal picked up by the mth microphone, and $\Delta_m$ is the wave propagation delay of the mth microphone when the beam of the microphone array reach an angle of θ. Equation 1 can obtain the signal value output at an angle where the beam of the microphone array scans.

Figure 3:
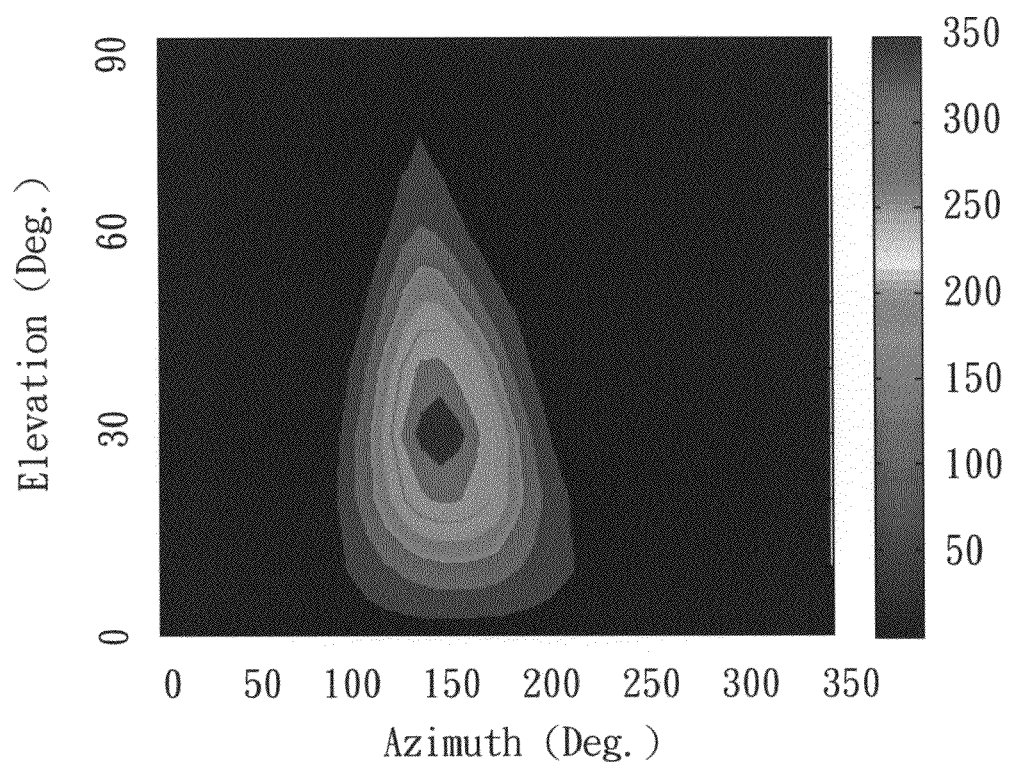
FIG. 3 is a diagram showing the distribution of a far-field sound field.

Refer to FIG. 3 for a far-field sound field distribution of a broadband noise source. The broadband noise source (having a bandwidth of 0-1.7 kHz) is detected at angles (150, 30) by a non-uniform microphone array (the second microphone array) containing 30 pieces of microphones, and then the received signals are calculated to obtain the distribution shown in FIG. 3. The position of the noise source is very obvious in FIG. 3.

Next is described the near-field acoustic camera technology of the present invention.

After the first sound pick-up device 32 picks up the sound source of a detected object, the sound field is output to the data retrieving system 38. An acoustic inverse computation module 42 of the data retrieving system 38 is used to obtain the strength of the sound source of the detected object. An acoustic post-processor 44 of the data retrieving system 38 is used to obtain the sound pressure, particle velocity, sound intensity and sound power of the noise source. Then, the results output by the acoustic inverse computation module 42 and acoustic post-processor 44 are presented on the display module 40, where the display module 40 may be a display screen.

Figure 4:
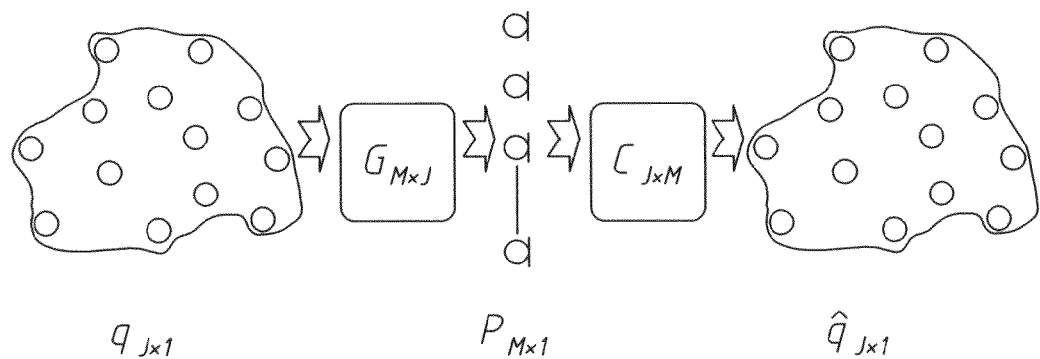
FIG. 4 is a diagram schematically showing the acoustic equivalent source method used in the present invention.

The near-field acoustic camera 30 uses the acoustic inverse computation module 42 and the technology thereof to calculate the source strength distribution image. The acoustic post-processor 44 is used to obtain distribution images of the sound pressure (p), particle velocity ($u_n$), sound intensity ($I_n$) and sound power (w) on the reconstruction surface. The acoustic inverse computation technology is realized with an acoustic equivalent source method. Refer to FIG. 4. The sound pressure (detected by the microphone array) of the sound source (virtual sound source) of the detected object can be expressed by Equation 2

$$P_{M \times 1} = G_{M \times J} q_{J \times 1} \quad (2)$$

where J and M are respectively the numbers of the virtual sound sources and the microphones, q the strengths of the virtual sound sources, G the propagation matrix of the virtual sound sources and the microphones, and p the signals detected by the microphone array. An inverse filter can be used to detect the strengths of the virtual sound sources. For example, $C_{J \times M} G_{M \times J} \approx I$, where I is a J×J unitary matrix. The model of the propagation matrix G is a spherical wave. Therefore, the source strength $\hat{q}_{J \times 1}$ can be learned from Equation 3

$$\hat{q}_{J \times 1} = C_{J \times M} P_{M \times 1} = C_{J \times M} G_{M \times J} q_{J \times 1} \approx q_{J \times 1} \quad (3)$$

Figure 5:
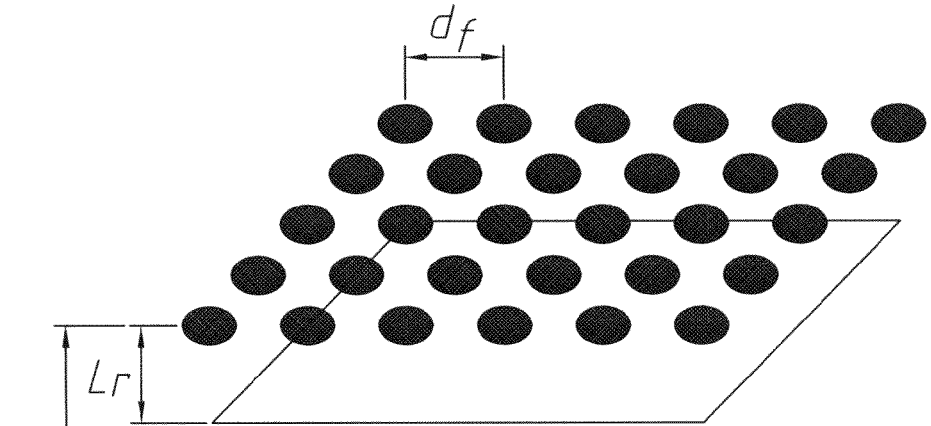
FIG. 5 is a diagram schematically showing the structure of a microphone array according to the present invention.
Figure 5:
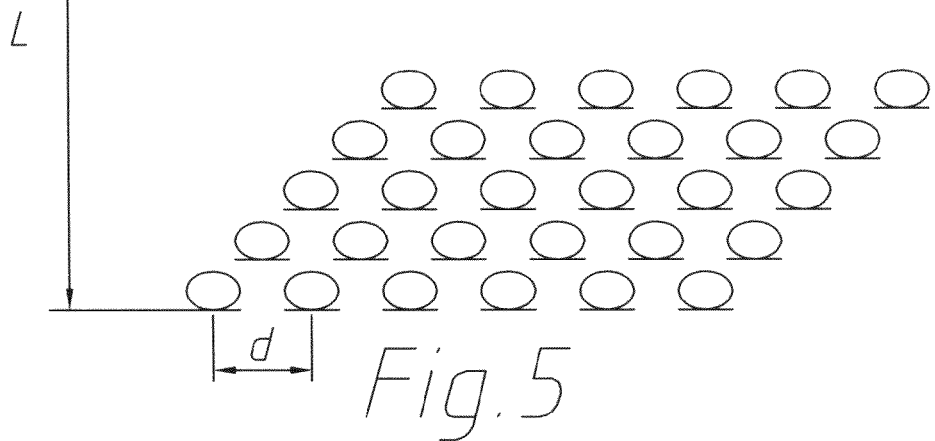
Figure 6:
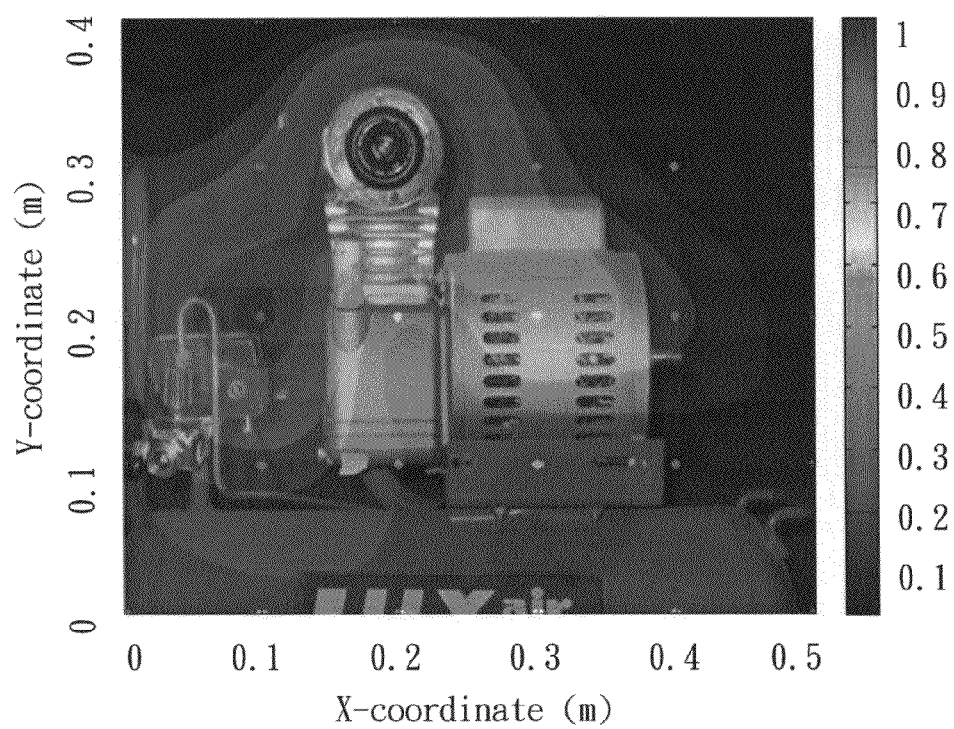
FIG. 6 is a diagram showing the strength distribution of a sound source according to the present invention.
Figure 7:
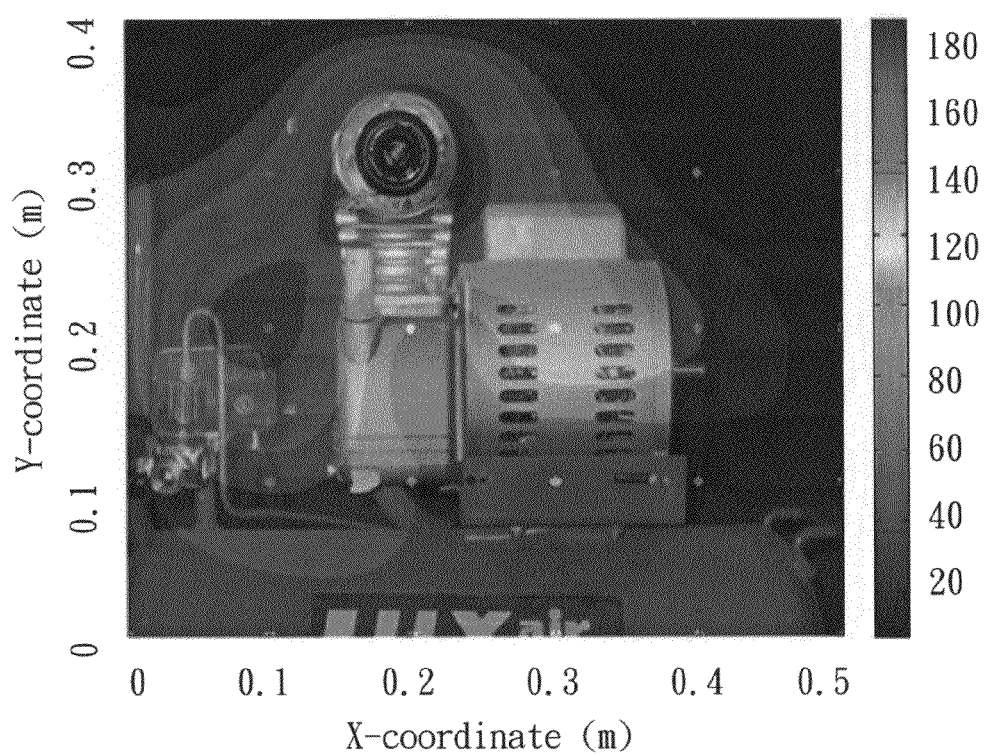
FIG. 7 is a diagram showing the distribution of sound pressure according to the present invention.
Figure 8:
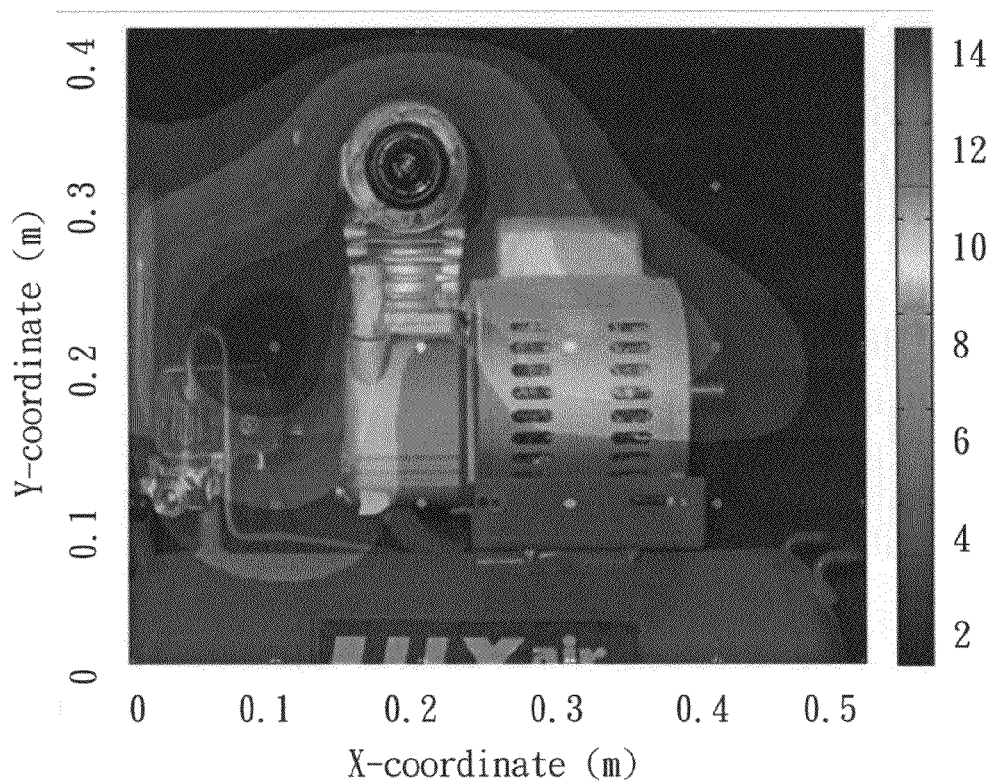
FIG. 8 is a diagram showing the distribution of particle velocity according to the present invention.
Figure 9:
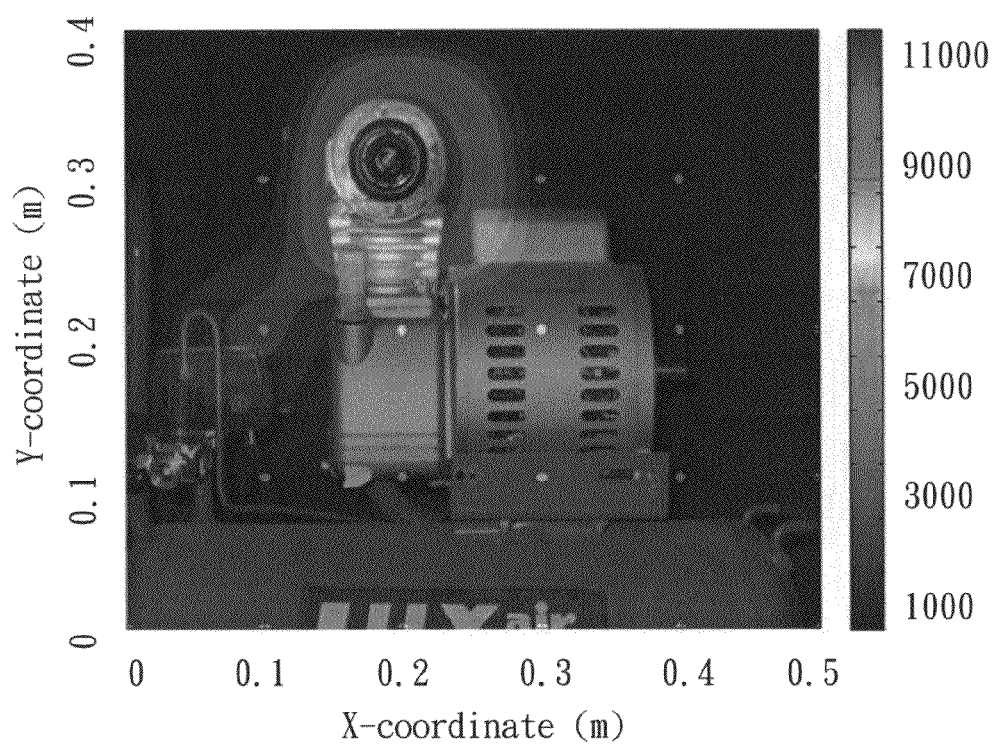
FIG. 9 is a diagram showing the distribution of sound intensity according to the present invention.

Refer to FIG. 5. When the source strength is known, the sound pressure $p_r$ (p denotes the sound pressure and r denotes the reconstruction surface) on the reconstruction surface can be obtained with the acoustic post-processor 44 and Equation 4:

$$p_r = G_r \hat{q} \quad (4)$$

where $G_r$ is the propagation matrix between the focal surface and the reconstruction surface, and the model thereof is also a spherical wave, and where $\hat{q}$ is the calculated source strength by Equation 3.

According to the Euler Equations, the particle velocity $u_n$ and sound intensity $I_n$ along the normal can be obtained with Equation 5 and Equation 6.

Equation 5 is expressed by $$u_n(x, \omega) = \frac{-1}{j\rho\omega} \frac{\partial}{\partial n} p_r(x, \omega) \quad (5)$$

where x is the coordinates of a point on the reconstruction surface, ω=2πf, f is the frequency and n is an normal direction.

Equation 6 is expressed by $$I_n(t) = p_r(t) u_n(t) \quad (6)$$

where $p_r$ is the sound pressure on the reconstruction surface and t is the time.

The sound power W(t) can be obtained with Equation 7:

$$W(t) = \int_S I_n(t) dS \quad (7)$$

where S is the area.

Refer to from FIG. 6 to FIG. 9 diagrams showing that a 5×6 uniform microphone array (the first microphone array) is used to detect an air compressor. The sound signals picked up by the microphone array are calculated with the inverse computation technology to obtain the distributions of the source strength ($\hat{q}$), sound pressure (p), particle velocity ($u_n$), and sound intensity ($I_n$) of the near-field sound source. The sound power W(t) of the reconstructed sound field is 125.746 dB.

Below are described the beam pattern and the cost function of the far-field acoustic camera 30.

Figure 10:
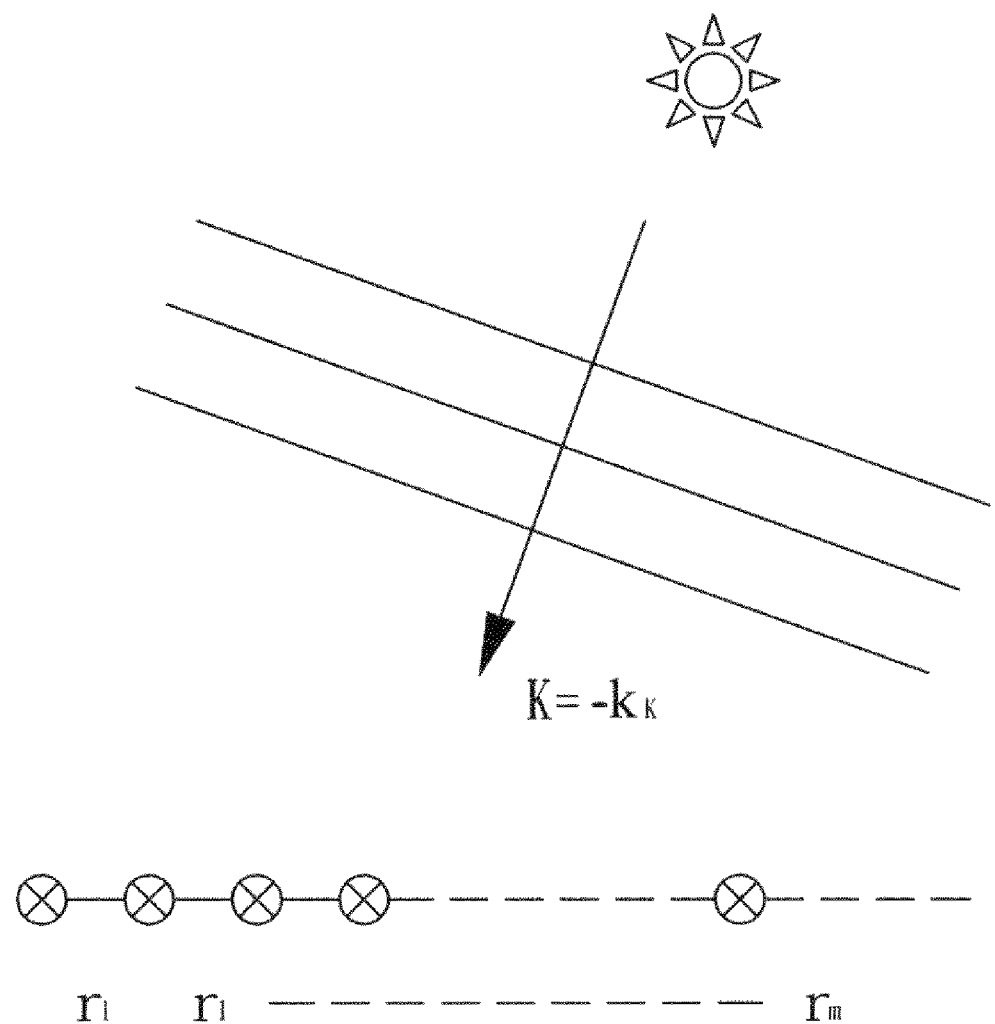
FIG. 10 is a diagram schematically showing that a far-field plane wave propagates into a microphone array according to the present invention.

Refer to FIG. 10. The wave-number-domain beam pattern of the far-field acoustic camera 30 can be calculated with Equation 8:

$$b = \frac{1}{M} \sum_{m=1}^{M} e^{j k \cdot r_m} \quad (8)$$

where k is the wave number, and $r_m$ the position vector of the mth microphone, k=−kx a wave number of a plane wave incident from the direction x, and M the number of the microphones.

As the z coordinate is 0 on the microphone surface of the Cartesian coordinate system, Equation 8 can be simplified into Equation 9:

$$b = \frac{1}{M} \sum_{m=1}^{M} e^{j(k_x x_m + k_y y_m)} \quad (9)$$

where $k_x$ and $k_y$ are respectively the wave number vectors along the x direction and the y direction, and $x_m$ and $y_m$ are respectively the position coordinates of the mth microphone along the x direction and the y direction.

Figure 11:
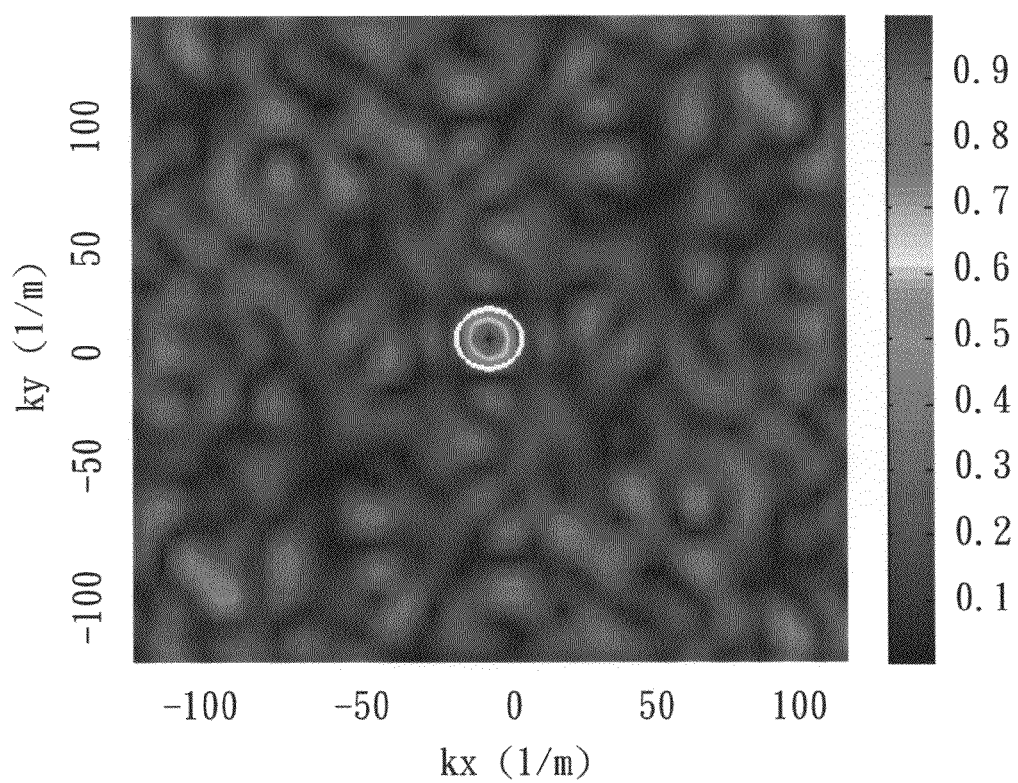
FIG. 11 is a diagram showing the main lobe and the side lobes of a beam pattern of a far-field sound source according to the present invention.

In order to determine which array deployment is optimal, a cost function must be given. Firstly, a circular main-lobe region is defined at the center of the $k_x$–$k_y$ plane with the radius thereof 10 m$^{-1}$. The area outside the circular main lobe is the side-lobe region, as shown in FIG. 11. The cost function can be expressed by Equation 10:

$$Q = \frac{\tilde{m}}{\tilde{s}} \quad (10)$$

where $\tilde{m}$ and $\tilde{s}$ are respectively the maximum main lobe and the maximum side lobe.

Below are described the beam pattern and the cost function of the near-field acoustic camera 30.

Figure 12:
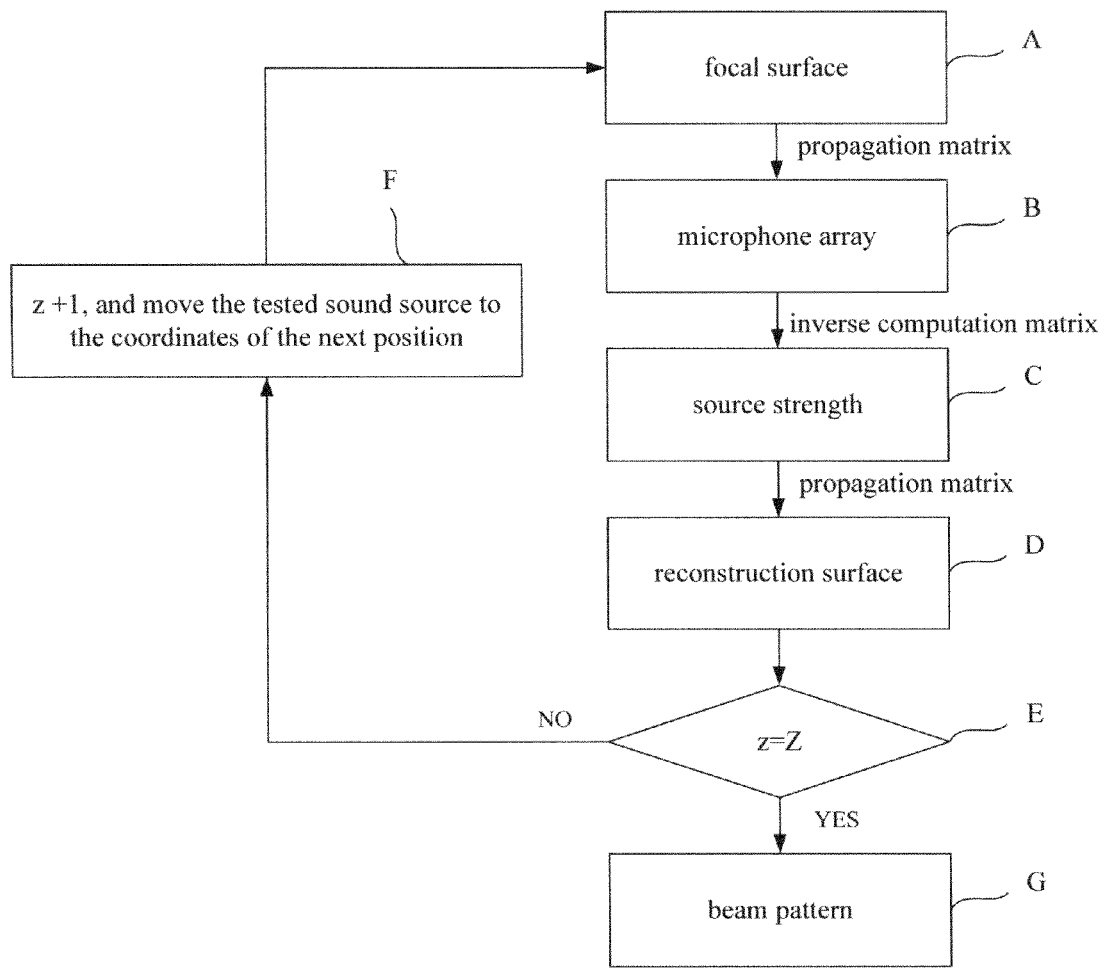
FIG. 12 is a flowchart of the process of calculating a near-field beam pattern according to the present invention.

For the near-field acoustic camera 30, the deployment of the microphone array is mainly to maximize a plurality of main lobes and prevent the main lobes from being defocused. The near-field beam pattern is different from the far-field beam pattern in that the near-field beam pattern has a plurality of main lobes. Therefore, an appropriate cost function must be defined to find out the regions of the main lobes. Refer to FIG. 12. The process of calculating the near-field beam pattern includes the following steps:

Step A: Suppose that a tested sound source (a spherical wave) is placed at an initial point (z=0) of the focal surface and able to move along the focal surface;

Step B: The sound pressure p is picked up by the microphone array during the wave propagation of the spherical wave;

Step C: The sound pressure p is processed with the inverse computation matrix C (such as Equation 3) to obtain the strength q̂ of the virtual sound sources on the focal surface;

Step D: Equation 4 is used to obtain the sound pressure $p_r^z$ on the reconstruction surface, and $p_r^z$ is normalized to have a value of 0-1;

Step E: Determine whether z=Z; If z=Z, the process proceeds to Step G; If z≠Z, the process proceeds to Step F;

Step F: z is increased by an increment of 1 to move the tested spherical wave to the coordinates of the next position, and then Steps B-D are repeated; and Step G: The beam pattern is obtained.

The beam pattern can be obtained from Equation 11:

$$b = \left[ \sum_{z=1}^{Z} |p_r^z(1,1)| \sum_{z=1}^{Z} |p_r^z(2,1)| \ldots \sum_{z=1}^{Z} |p_r^z(\Gamma,1)| \right]^T, \quad (11)$$

$$z = 0, 1, \ldots, Z$$

where Γ is an image point on the reconstruction surface, and Z>Γ usually.

Figure 13:
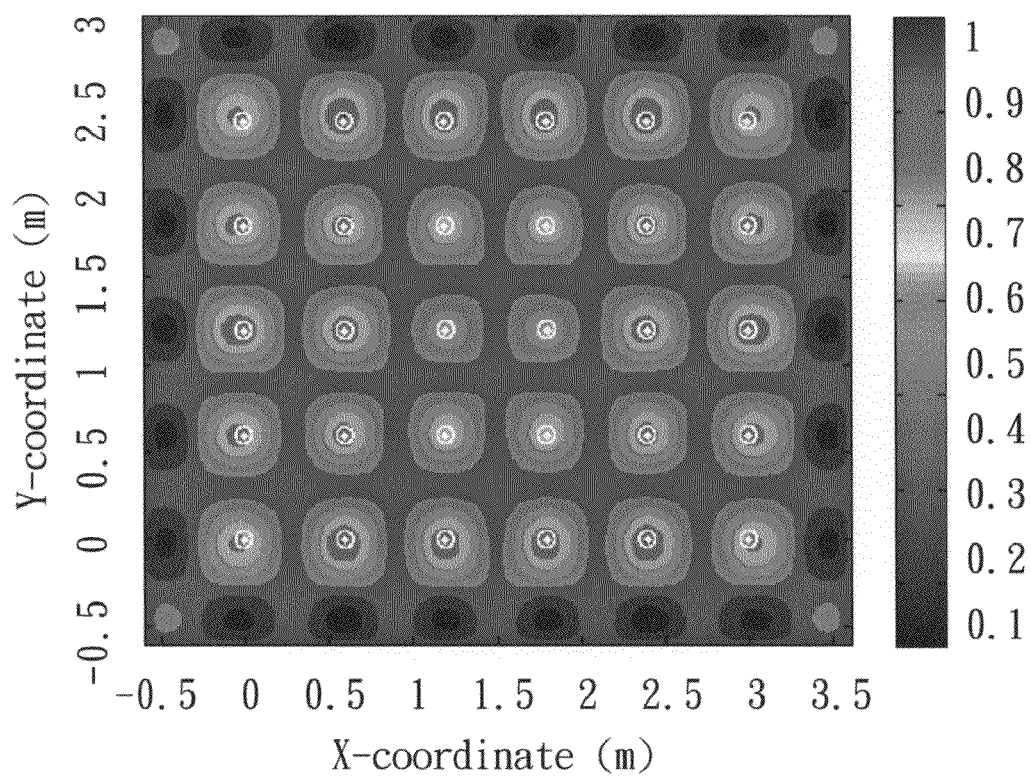
FIG. 13 is a diagram showing the main lobes of a beam pattern of a near-field sound source according to the present invention.

Next, the cost function is defined in the development of the optimal deployment of the microphones. Refer to FIG. 13. Firstly, a circle having a radius of $r_m$ is defined at every focal point. The area inside the circle is the region where the main lobes are distributed. The maximum main lobe of the jth focal point should be within the assigned circle and greater than 0.707 (3 dB attenuation). Thus, the near-field cost function can be expressed by Equation 12:

$$Q = \sum_{j=1}^{J} m_j \quad (12)$$

where m is the maximum main lobe, and j is the ordinal number of a focal point. Then, the greater the value of Q, the better the deployment of microphones.

The IBMC (Inter-Block Monte Carlo) method is used to verify the optimal deployment of the microphone array of the present invention.

Figure 14:
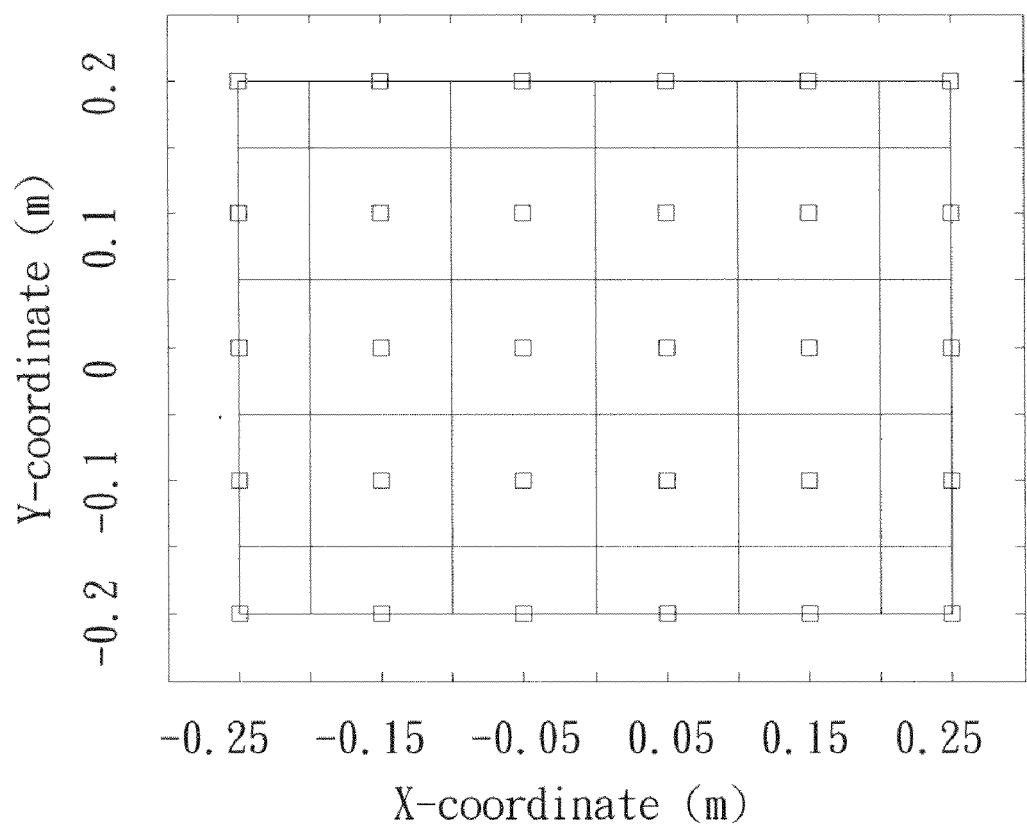
FIG. 14 is a diagram schematically showing the assigned sampling areas according to the present invention.
Figure 15:
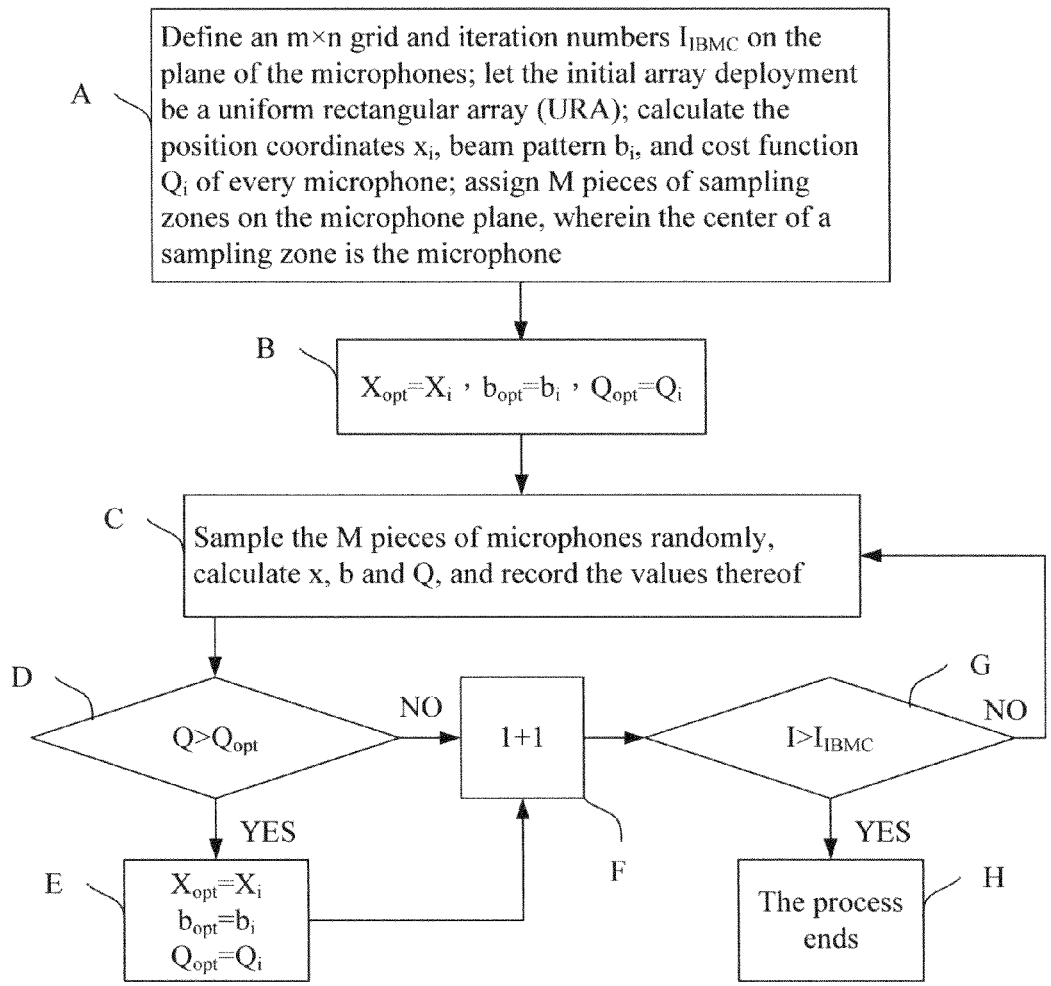
FIG. 15 is a flowchart of the IBMC method according to the present invention.

The basic method for deploying the microphone array is the Monte Carlo method, which uses a random sampling method to find out the best deployment of microphones. As shown in FIG. 14, the IBMC method is an extension of the Monte Carlo method and different from the Monte Carlo method in that the IBMC method performs random sampling within an assigned range, whereby the sampling efficiency is improved. Refer to FIG. 15. When applied to M pieces of microphones, the IBMC method includes the following steps:

Step A: Define an m×n grid and iteration numbers $I_{IBMC}$ on the plane of the microphones; let the initial array deployment be a uniform rectangular array (URA); calculate the position coordinates $x_i$, beam pattern $b_i$, and cost function $Q_i$ of every microphone; assign M pieces of sampling zones on the microphone plane, where the center of a sampling zone is the microphone;

Step B: Let the initial values be the optimal solutions, i.e. $x_{opt}=x_i$, $b_{opt}=b_i$, and $Q_{opt}=Q_i$;

Step C: Sample the M pieces of sampling zones randomly, and calculate x, b and Q, and record the values thereof;

Step D: Determine whether $Q>Q_{opt}$; if $Q>Q_{opt}$, the process proceeds to Step E; if $Q \leq Q_{opt}$, the process proceeds to Step F;

Step E: $x_{opt}=x$, $b_{opt}=b$, and $Q_{opt}=Q$;

Step F: I+1;

Step G: Determine whether $I>I_{IBMC}$; if $I>I_{IBMC}$, the process proceeds to Step H; if $I \leq I_{IBMC}$, the process returns to Step C; and Step H: The process ends.

Figure 16:
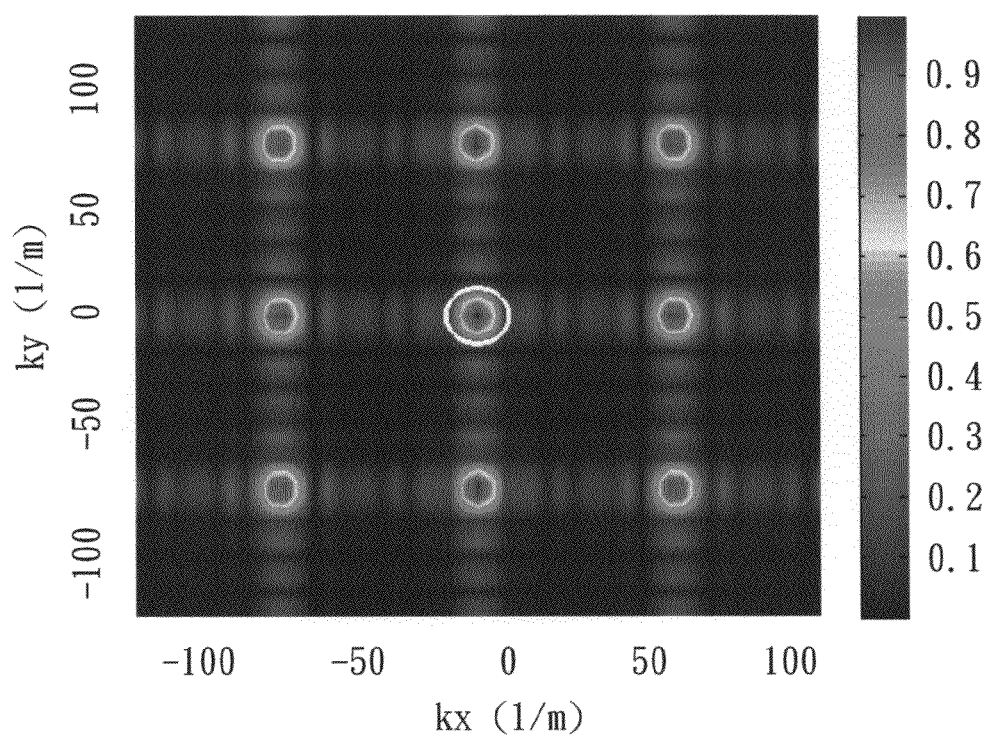
FIG. 16 is a diagram showing the beam pattern of a far-field uniform rectangular microphone array according to the present invention.
Figure 17:
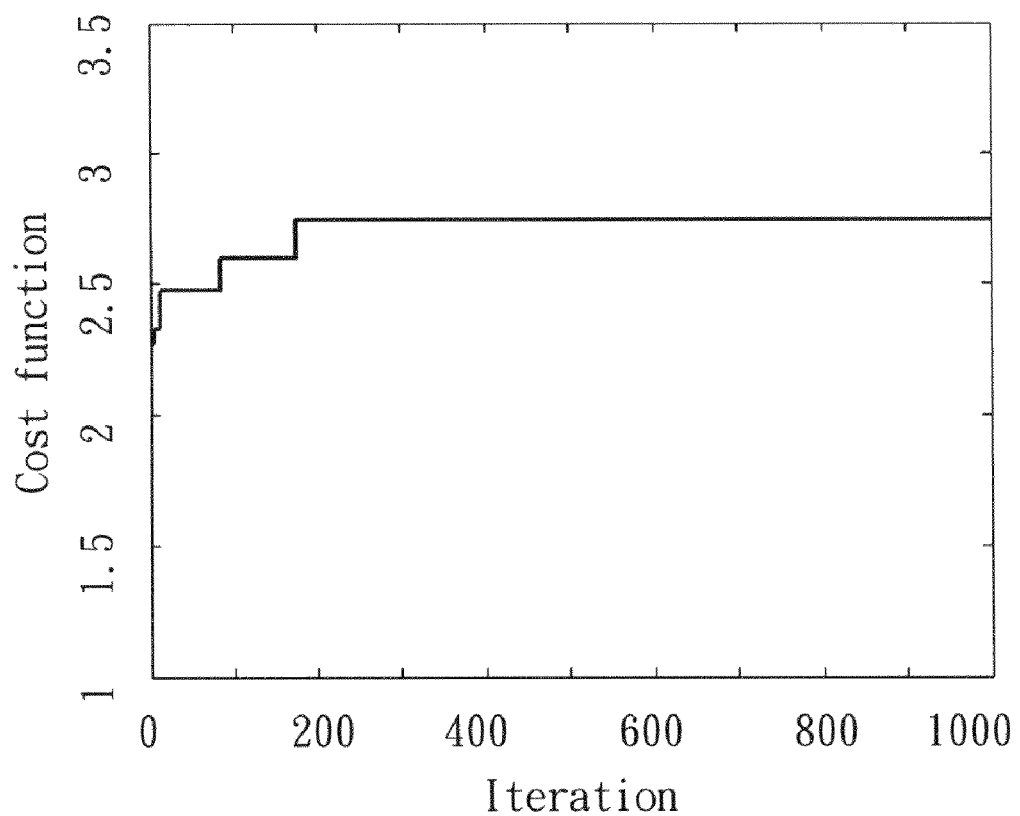
FIG. 17 is a diagram showing the learning curve recording the process that the IBMC method works out far-field microphone arrays according to the present invention.
Figure 18:
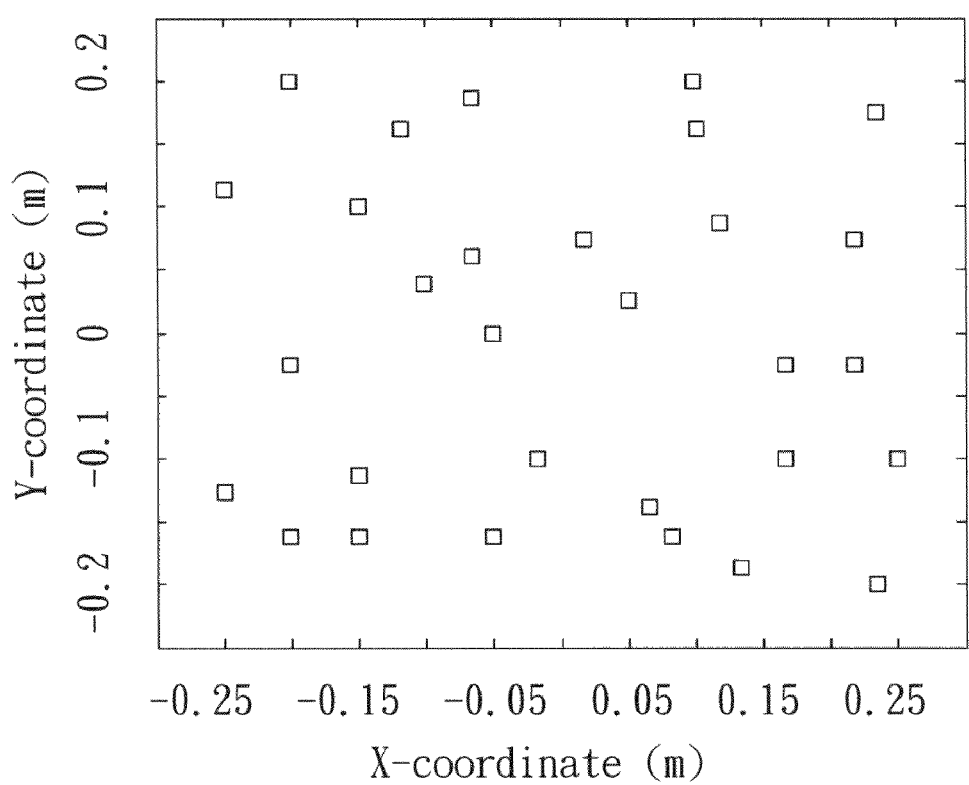
FIG. 18 is a diagram schematically showing the best far-field microphone array deployment that the IBMC method attains according to the present invention.

Next is described the application of the IBMC method to the deployment of a far-field microphone array, where the IBMC method is mainly used to maximize the main lobes, minimize the side lobes and eliminate the high-frequency grating lobes. Firstly is assigned the frequency to be 7 kHz, and calculated the beam pattern of a uniform rectangular microphone array (the initial deployment of microphones) with the spacing of two adjacent microphones being 10 cm (about double the wavelength). From the beam pattern shown in FIG. 16, it can be seen that the uniform rectangular array has many grating lobes at high frequency with a Q value of only 1.0366. Refer to FIG. 17 for the learning curve recording the process that the IBMC method works out far-field microphone arrays. After the application of the IBMC method, it is observed that the value of Q increase with the increasing iteration number. It means that the IBMC method can obtain a far-field microphone array deployment better than the rectangular microphone array. FIG. 18 shows the best far-field microphone array deployment that the IBMC method attains in the final operation thereof, where Q has a value of 2.7427 (after 1.5 minute processing).

Figure 19:
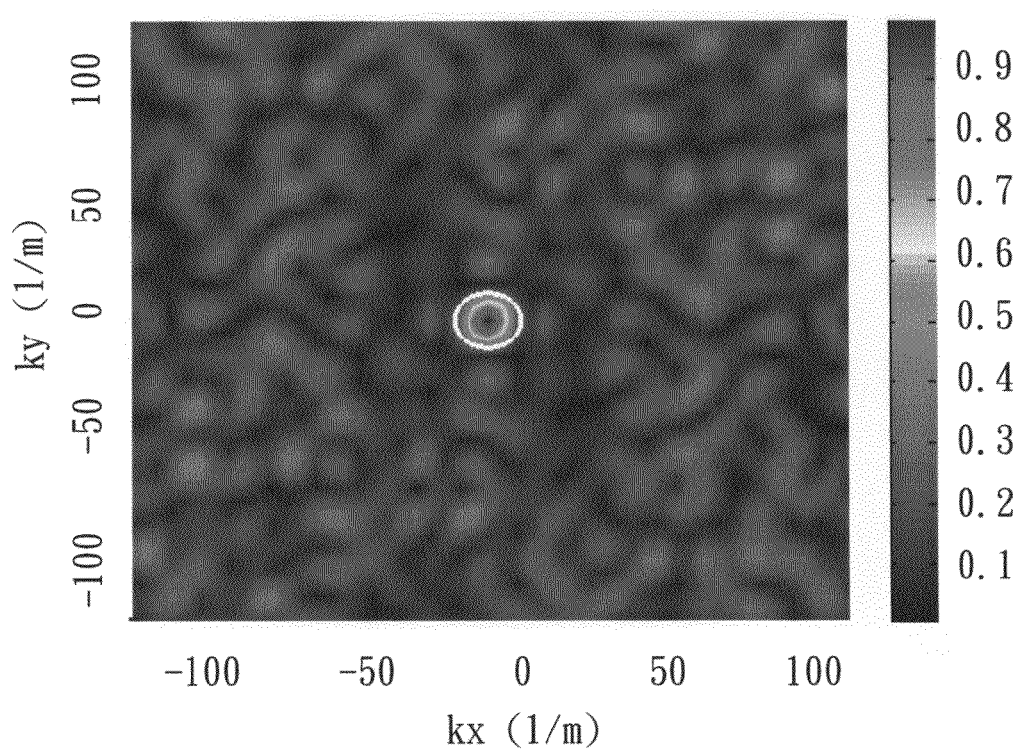
FIG. 19 is a diagram showing the beam pattern of the best far-field microphone array deployment obtained by the IBMC method according to the present invention.

From FIG. 19, it is observed that the beam pattern of the best far-field microphone array deployment has none grating lobe at high frequency but has a very large main lobe at the center thereof. Therefore, after the optimization by the IBMC method, it is proved that the best far-field microphone array deployment is a random microphone array, as shown in FIG. 18.

Therefore, the second microphone array of the present invention adopts a random microphone array to achieve optimal far-field imaging. The second microphone array is a rectangular array having a first side and a second side, and the first side is smaller than or equal to the second side. In the far-field mode, the lowest frequency $f_{min}$ that the acoustic camera 30 can detect should satisfy the equation:

$$f_{min} = \frac{c}{D}$$

where D is the length of the first side, c the velocity of the wave (m/s), and $f_{min}$ the lowest frequency (Hz).

Figure 20:
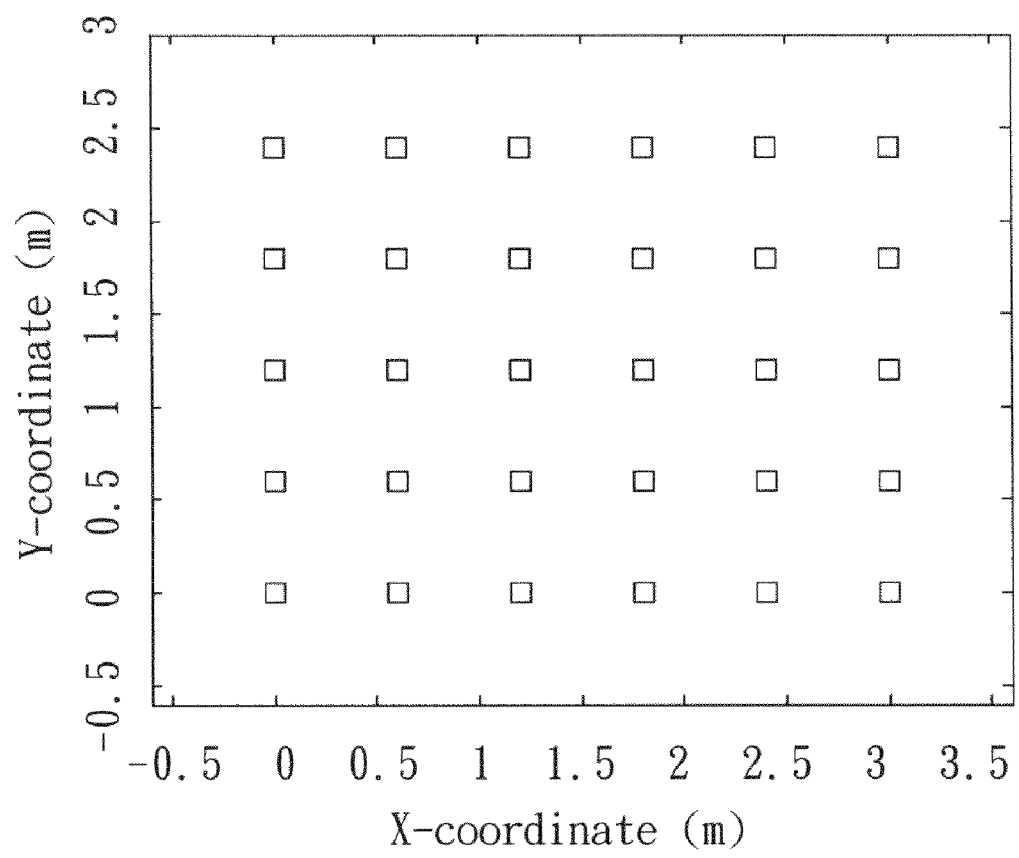
FIG. 20 is a diagram schematically showing a 5×6 near-field uniform rectangular microphone array according to the present invention.
Figure 21:
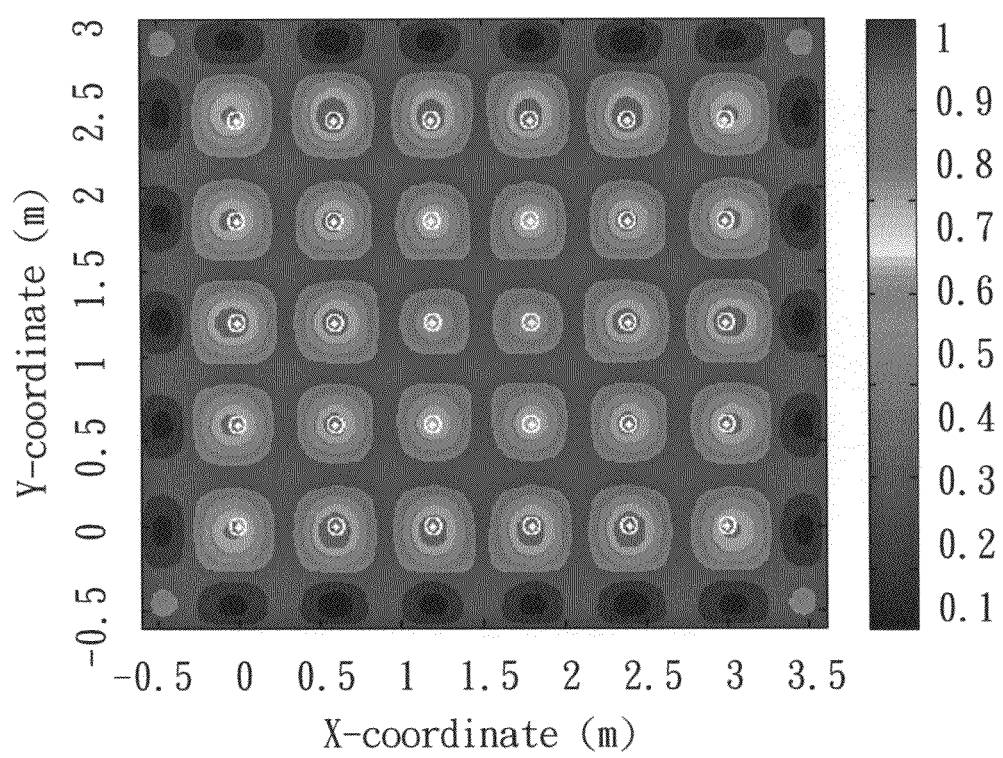
FIG. 21 is a diagram showing the beam pattern of a 5×6 near-field uniform rectangular microphone array according to the present invention.
Figure 22:
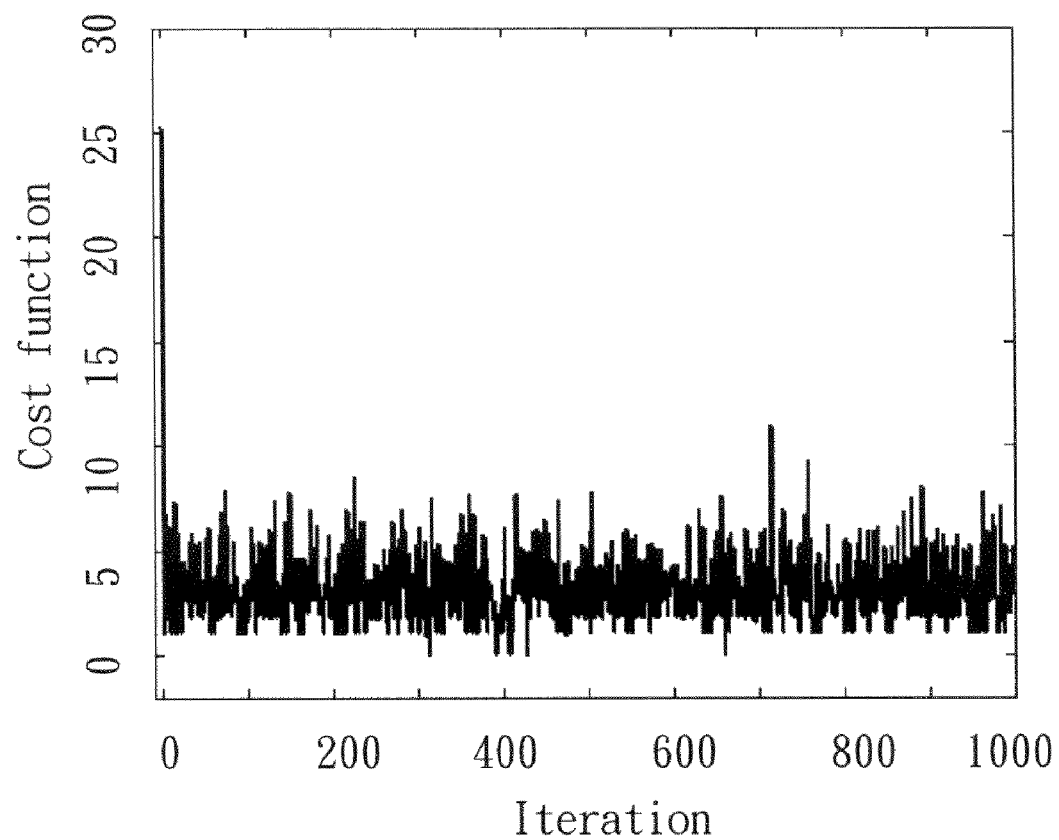
FIG. 22 is a diagram showing the learning curve recording the process that the IBMC method works out near-field microphone arrays according to the present invention.
Figure 23:
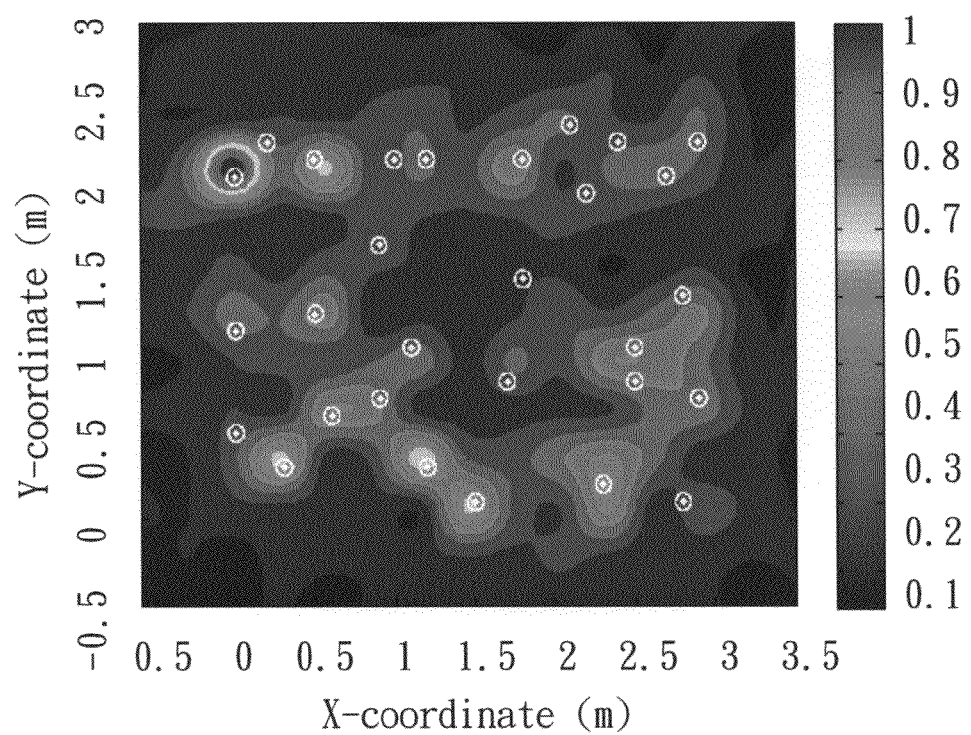
FIG. 23 is a diagram showing the beam pattern of the worst near-field microphone array deployment that the IBMC method attains according to the present invention.

Next is described the application of the IBMC method to the deployment of a near-field microphone array, where the IBMC method is mainly used to maximize multiple main lobes and prevent the main lobes defocused. Firstly is assigned the frequency to be 1.7 kHz, and calculated the beam pattern (shown in FIG. 21) of a uniform rectangular microphone array (the initial deployment of microphones shown in FIG. 20) with the spacing of two adjacent microphones being 60 cm (about triple the wavelength). Refer to FIG. 21 for the beam pattern of the uniform rectangular microphone array. As shown in FIG. 21, the multiple main lobes are not defocused, and the Q value is 25.884. FIG. 22 shows the learning curve recording the process that the IBMC method works out near-field microphone arrays. It can be clearly seen in FIG. 22 that the maximum Q value appears at the beginning where the microphone array has a deployment of a uniform rectangular microphone array. FIG. 23 shows a low-Q (Q=0) beam pattern of a near-field microphone array worked out by the IBMC method. In FIG. 22, the main lobes are not defocused. In FIG. 23, some focuses have none main lobe, and many main lobes are defocused. Via the optimization by the IBMC method, it is proved that the best near-field microphone array deployment is a uniform rectangular microphone array, as shown in FIG. 20.

Therefore, the first microphone array of the present invention adopts a uniform rectangular microphone array to achieve optimal near-field imaging. In the near-field mode, the highest frequency $f_{max}$ that the acoustic camera 30 can detect should satisfy the equation:

$$f_{max} = \frac{c}{2d}$$

where d is the distance between two adjacent microphones, c is the sound speed (m/s), and $f_{max}$ is the maximum frequency (Hz).

Figure 24:
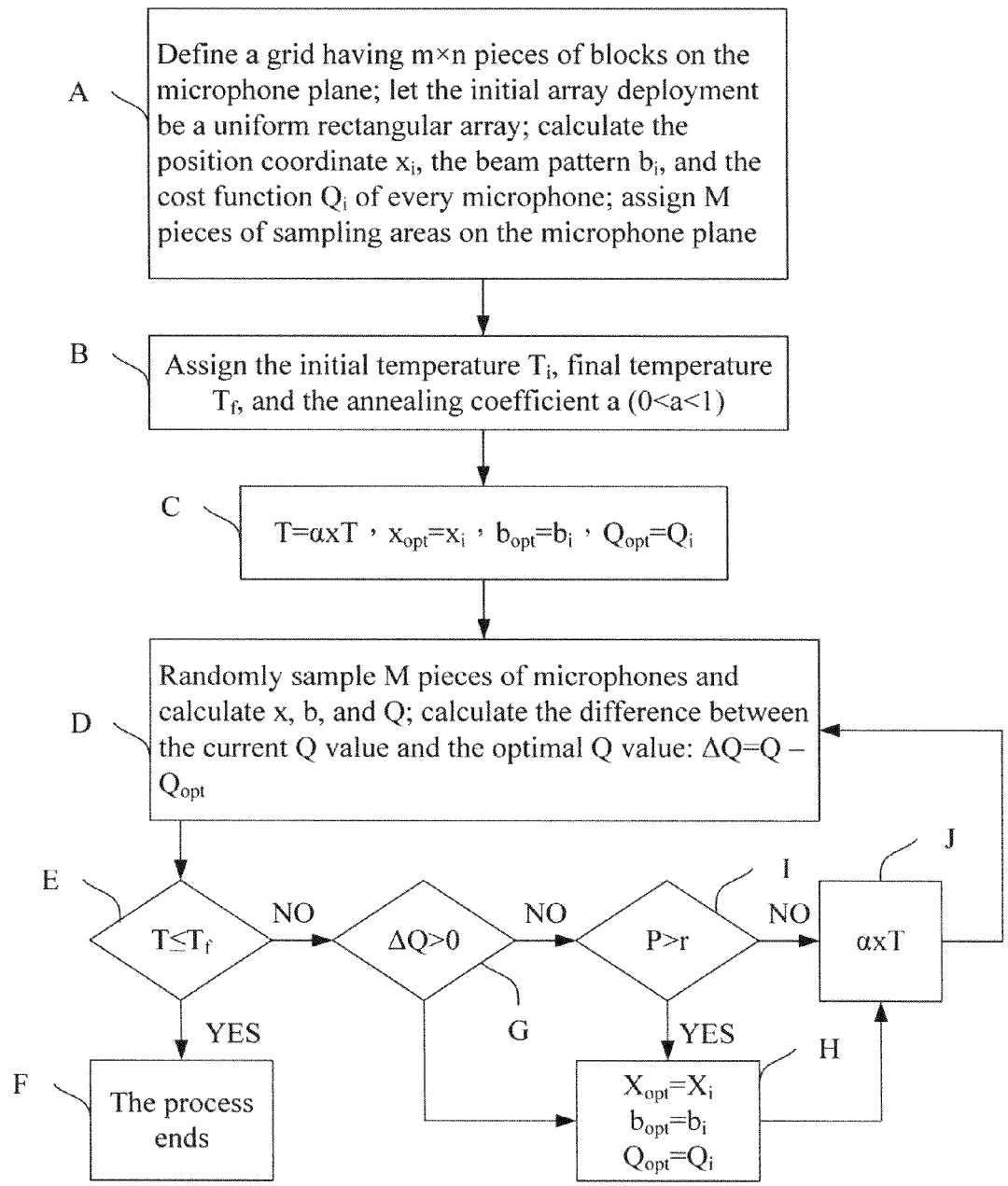
FIG. 24 is a flowchart of the SA method according to the present invention.

Further, a simulated annealing (SA) method is used to verify the optimal microphone array deployment of the present invention. The SA method adopts the spirit of the annealing method—random sampling. Refer to FIG. 24. The SA method applying to M pieces of microphones includes the following steps:

Step A: Define a grid having m×n pieces of blocks on the microphone plane; let the initial array deployment be a uniform rectangular array; calculate the position coordinate $x_i$, the beam pattern $b_i$, and the cost function $Q_i$ of every microphone; assign M pieces of sampling areas on the microphone plane with the sampling center being the microphone;

Step B: Assign the initial temperature $T_i$, final temperature $T_f$, and the annealing coefficient a (0<a<1), where a higher initial temperature can prevent from the obtained solution being not the global optimal solution but only the local optimal solution;

Step C: Perform an annealing with $T=a \times T_i$; let the initial values be the optimal solutions, i.e. $x_{opt}=x_i$, $b_{opt}=b_i$, and $Q_{opt}=Q_i$;

Step D: Randomly sample M pieces of microphones and calculate Tx, b, and Q; calculate the difference between the current Q value and the optimal Q value:

$$\Delta Q = Q - Q_{opt} \tag{13}$$

Step E: Determine whether $T \leq T_f$; if $T \leq T_f$, the process proceeds to Step F; if $T > T_f$, the process proceeds to Step G;

Step F: The process ends;

Step G: Determine whether $\Delta Q > 0$; if $\Delta Q > 0$, the process proceeds to Step H; if $\Delta Q \leq 0$, the process proceeds to Step I;

Step H: The optimal values are replaced, i.e. $x_{opt}=x$, $b_{opt}=b$, and $Q_{opt}=Q$;

Step I: Use Equation 14 to calculate the likely acceptable solution lest the obtained solution be not the global optimal solution but only the local optimal solution; Equation 14 is expressed by $$P(\Delta Q, T) = e^{\Delta Q/T} \tag{14}$$

where γ is a random number inside the range $0 \leq \gamma \leq 1$; determine whether $P > \gamma$; if $P > \gamma$, the process proceeds to Step H; if $P \leq \gamma$, the process proceeds to Step J; and Step J: Perform an annealing with $T = a \times T$, and then the process returns to Step D.

No matter whether the optimal values are replaced, the annealing with $T = a \times T$ would be performed, and the steps behind Step D (including Step D) would be repeated.

In Step E, if $T \leq T_f$, the process ends; then are obtained the optimal microphone position $x_{opt}$, the optimal beam pattern $b_{opt}$ and the optimal cost function $Q_{opt}$.

Figure 25:
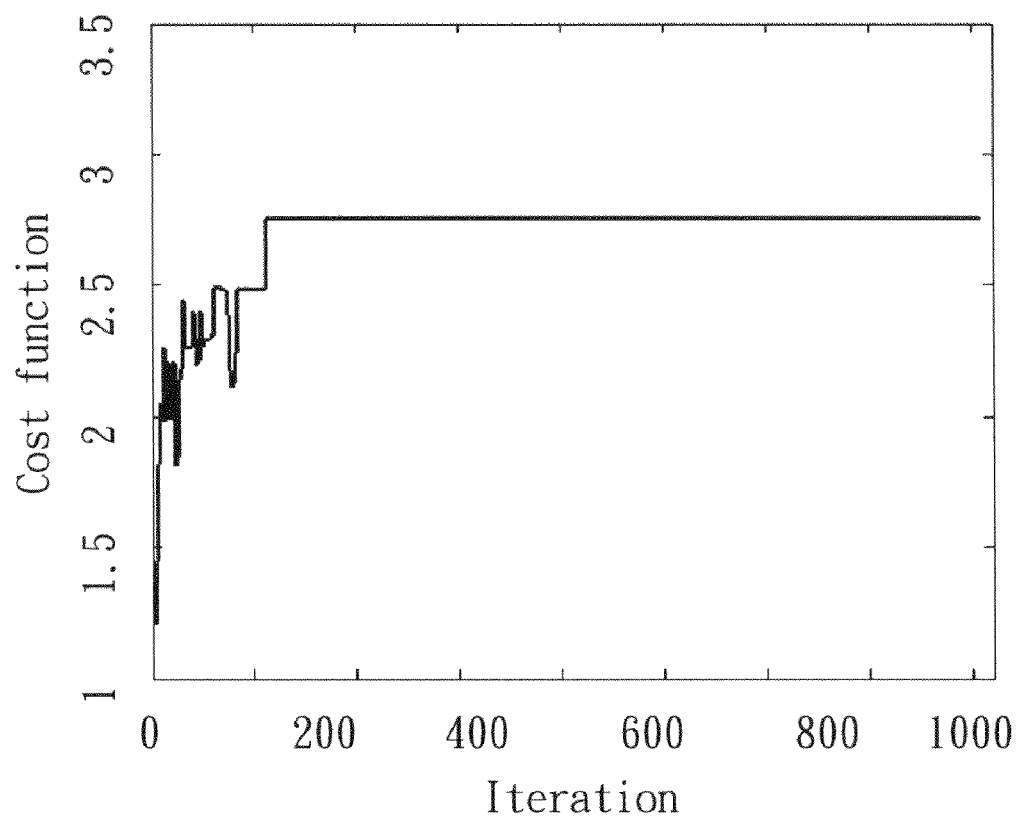
FIG. 25 is a diagram showing the learning curve recording the process that the SA method works out far-field microphone arrays according to the present invention.
Figure 26:
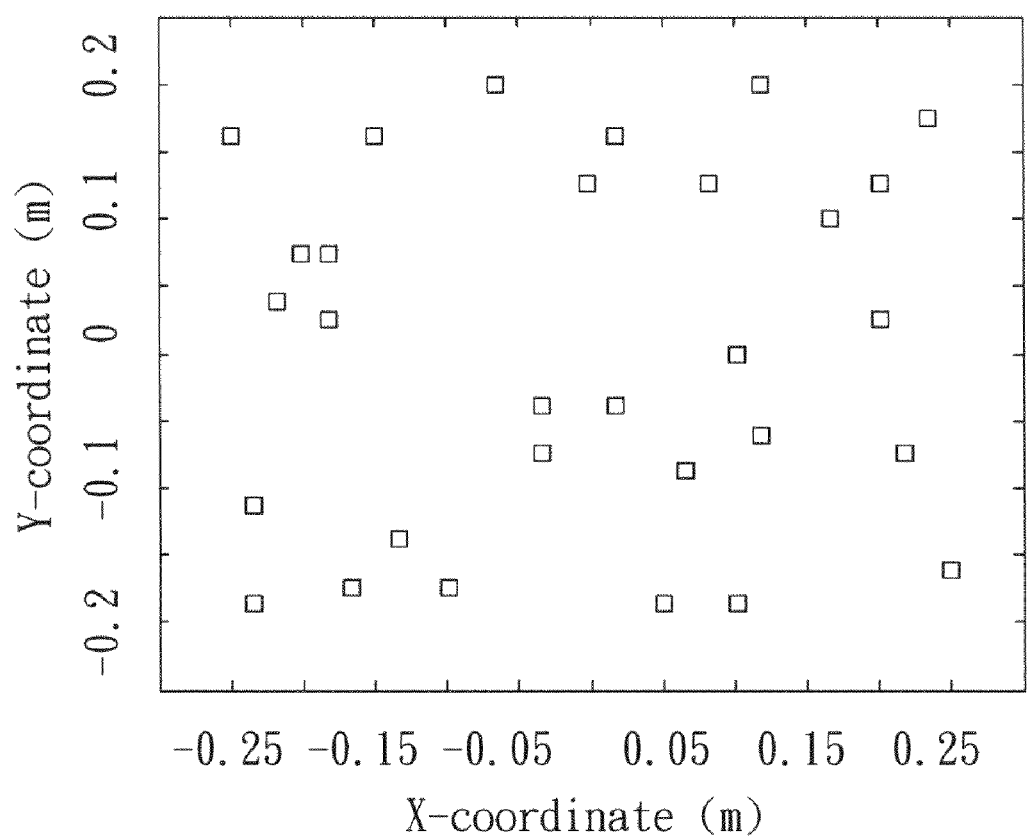
FIG. 26 is a diagram schematically showing the best far-field microphone array deployment that the SA method attains according to the present invention.
Figure 27:
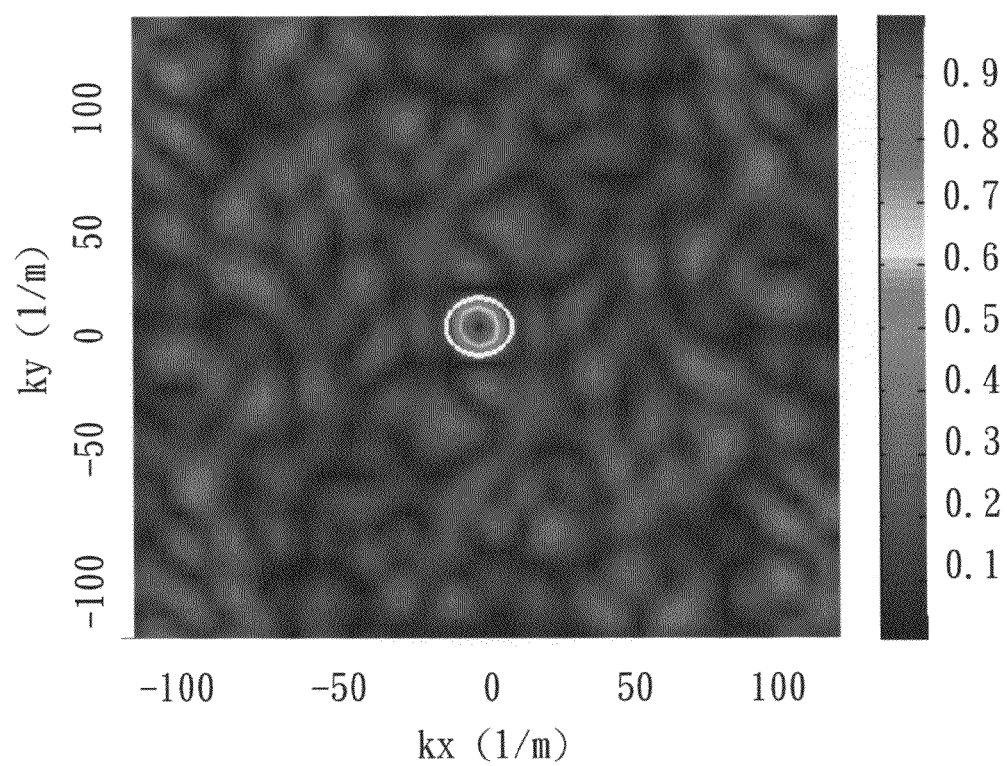
FIG. 27 is a diagram showing the beam pattern of the best far-field microphone array deployment obtained by the SA method according to the present invention.

When applied to the deployment of a far-field microphone array (the second microphone array), the SA method is mainly to maximize main lobes, minimize side lobes, and eliminate grating lobes. Firstly is assigned the frequency to be 7 kHz, and calculated the beam pattern of a uniform rectangular microphone array (the initial deployment of microphones) with the spacing of two adjacent microphones being 10 cm (about double the wavelength), as shown in FIG. 16. As shown in FIG. 25, it is observed after the application of the SA method that the Q value increases with the increasing iteration number. It means that the SA method can obtain a far-field microphone array deployment better than the rectangular microphone array. FIG. 26 shows the best far-field microphone array deployment that the SA method attains in the final operation thereof, where Q has a value of 2.7518 (after 1 minute processing). Therefore, the SA method (after 1 minute processing) can find a better microphone deployment than the IBMC method (after 1.5 minute processing) more efficiently. From FIG. 27, it is observed that the beam pattern of the best far-field microphone array deployment has none grating lobe at high frequency but has a very large main lobe at the center thereof. Thus, via the efficient optimization by the SA method, it is proved that the best far-field microphone array deployment is a random microphone array, as shown in FIG. 26. Therefore, the output deployment of the SA method is the same as that of the IBMC method in the far-field mode.

Therefore, the second microphone array of the present invention adopts a random microphone array to achieve optimal far-field imaging. The second microphone array is a rectangular array having a first side and a second side, and the first side is smaller than or equal to the second side. In the far-field mode, the lowest frequency $f_{min}$ that the acoustic camera 30 can detect should satisfy the equation:

$$f_{min} = \frac{c}{D}$$

where D is the length of the first side, c is the sound speed (m/s), and $f_{min}$ the minimum frequency (Hz).

Figure 28:
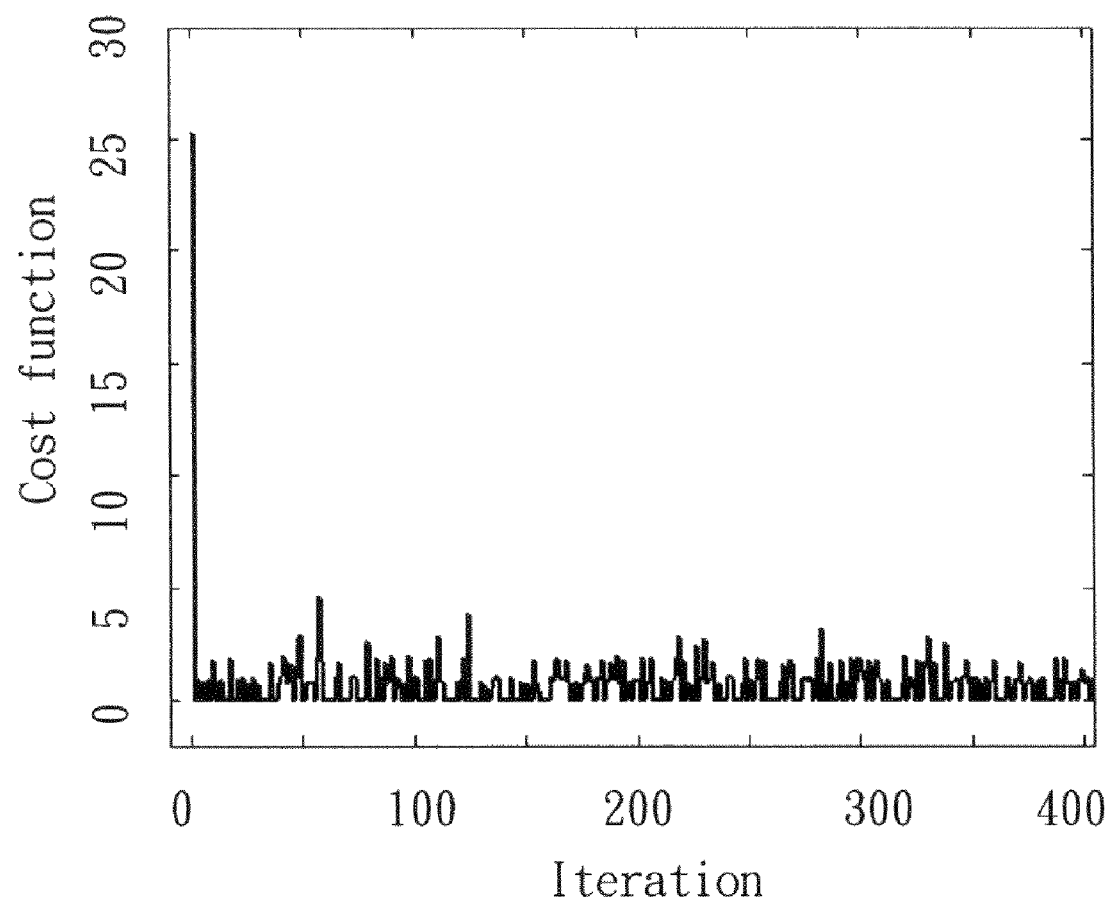
FIG. 28 is a diagram showing the learning curve recording the process that the SA method works out near-field microphone arrays according to the present invention.
Figure 29:
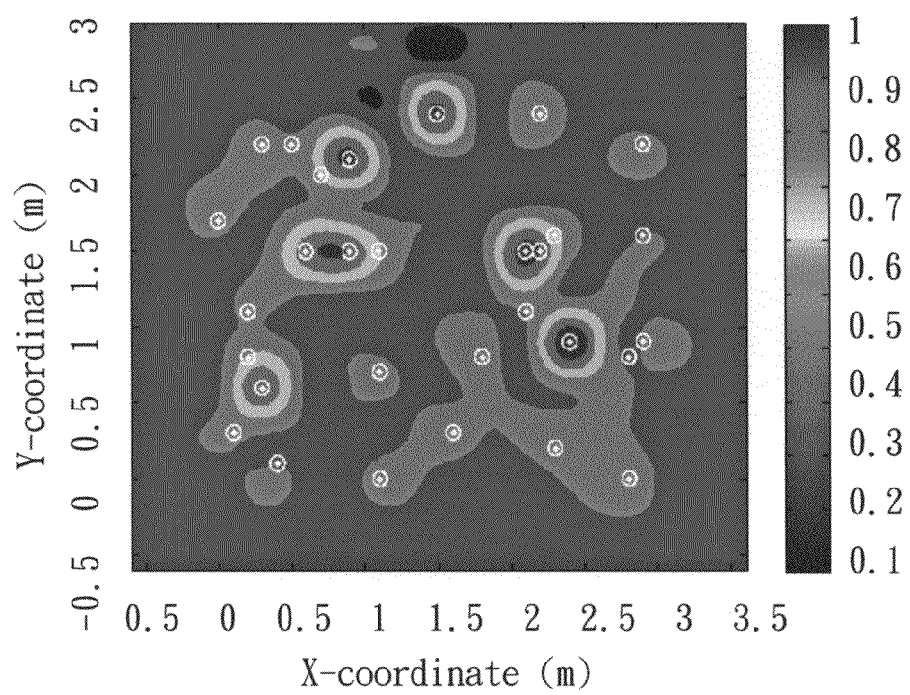
FIG. 29 is a diagram showing the beam pattern of the worst near-field microphone array deployment that the SA method attains according to the present invention.

Next is described the application of the SA method to the deployment of a near-field microphone array, where the SA method is mainly used to maximize multiple main lobes and prevent the main lobes defocused. Firstly is assigned the frequency to be 1.7 kHz, and calculated the beam pattern of a uniform rectangular microphone array (the initial deployment of microphones is shown in FIG. 20) with the spacing of two adjacent microphones being 60 cm (about triple the wavelength). Refer to FIG. 21 for the beam pattern of the uniform rectangular microphone array. As shown in FIG. 21, the multiple main lobes are not defocused, and the Q value is 25.884. FIG. 28 shows the learning curve recording the process that the SA method works out near-field microphone arrays. It can be clearly seen in FIG. 28 that the maximum Q value appears at the beginning where the microphone array has a deployment of a uniform rectangular microphone array. FIG. 29 shows a low-Q (Q=0) beam pattern of a near-field microphone array worked out by the SA method. In FIG. 22, the main lobes are not defocused but all at their focuses. In FIG. 29, some focuses have none main lobe, and many main lobes are defocused. Therefore, via the optimization by the SA method, it is proved that the best near-field microphone array deployment is a uniform rectangular microphone array, as shown in FIG. 20. Therefore, the output deployment of the SA method is the same as that of the IBMC method in the near-field mode.

Therefore, the first microphone array of the present invention adopts a uniform rectangular microphone array to achieve optimal near-field imaging. In the near-field mode, the highest frequency $f_{max}$ that the acoustic camera 30 can detect should satisfy the equation:

$$f_{max} = \frac{c}{2d}$$

where d is the distance between two adjacent microphones, c is the sound speed (m/s), and $f_{max}$ is the maximum frequency (Hz).

The present invention proposes an acoustic camera 30 comprising a first sound pick-up device 32, a second sound pick-up device 34, and a switch 36. The switch 36 respectively connects with the first sound pick-up device 32 and the second sound pick-up device 34. The switch 36 is used to select the first sound pick-up device 32 or the second sound pick-up device 34 to reconstruct the sound field of a detected object. The first sound pick-up device 32 has a first microphone array, which is a uniform microphone array to reconstruct a near-field sound field. The second sound pick-up device 34 has a second microphone array, which is a non-uniform microphone array to reconstruct a far-field sound field. The acoustic camera 30 of the present invention adopts a delay-and-sum module 46, an acoustic inverse computation module 42 and an acoustic post-processor 44 to process sound field imaging. Via the delay-and-sum module 46 and the acoustic inverse computation module 42, the present invention can effectively reduce the amount of calculation. As the first and second microphone arrays adopt the optimal designs, the delay-and-sum module 46, acoustic inverse computation module 42 and acoustic post-processor 44 can attain the best effect. The acoustic camera 30 of the present invention has two sets of microphone arrays respectively applied to a near-field sound field and a far-field sound field, and the switch 36 of the present invention is used to select the near-field mode or the far-field mode, whereby the acoustic camera 30 of the present invention can effectively acquire the image of the sound field of a noise source. The present invention also proposes the optimal deployments of the near-field and far-field microphone arrays, whereby the acoustic camera 30 can generate a beam pattern having fine main lobes, few side lobes and none grating lobe when reconstructing the sound field.

The acoustic camera 30 of the present invention uses the optimal method to acquire acoustic images, where the far-field mode uses the delay-and-sum method to process the sound pressure signals picked up by the microphone array to obtain the image of the sound field on the scan area, and where the near-field mode uses the acoustic inverse computation method to obtain the image of the sound field.

The embodiments described are only to exemplify the present invention but not to limit the scope of the present invention. Any equivalent modification or variation according to the shapes, structures, characteristics and spirit disclosed herein is to be included within the scope of the present invention.

What is claimed is:

1. An acoustic camera comprising
a first sound pick-up device and a second sound pick-up device both installed in said acoustic camera and used to pick up a sound source of a detected object;
a switch respectively connecting to said first sound pick-up device and said second sound pick-up device and used to select said first sound pick-up device or said second sound pick-up device to pick up a sound source of a detected object; and a data-retrieving system connecting to said first sound pick-up device and said second sound pick-up device, receiving signals of a sound source of a detected object, processing said signals, and outputting processing results to a display module.

2. The acoustic camera according to claim 1, wherein said data-retrieving system includes an acoustic inverse computation module, a delay-and-sum module, and an acoustic post-processor.

3. The acoustic camera according to claim 2, wherein said first sound pick-up device is used to pick up a near-field sound field in a near-field mode.

4. The acoustic camera according to claim 3, wherein said first sound pick-up device has a first microphone array containing a plurality of microphones.

5. The acoustic camera according to claim 4, wherein when picking up a near-field sound field in said near-field mode, a highest sound frequency said acoustic camera can detect satisfies an equation:

$$f_{max} = \frac{c}{2d}$$

Wherein d is a distance between two adjacent said microphones, and c is a velocity of wave (m/s), and $f_{max}$ is said highest sound frequency (Hz).

6. The acoustic camera according to claim 3, wherein when picking up a near-field sound field in said near-field mode, said first sound pick-up device picks up a sound source of a detected object and outputs a sound field of said sound source to said data-retrieving system, and said acoustic inverse computation module of said data-retrieving system obtains source strength of said sound source of said detected object, and said acoustic post-processor obtains sound pressure, particle velocity, sound intensity and sound power of said sound source of said detected object; said source strength, said sound pressure, said particle velocity, said sound intensity and said sound power are output to said display module.

7. The acoustic camera according to claim 2, wherein said second sound pick-up device is used to pick up a far-field sound field in a far-field mode.

8. The acoustic camera according to claim 7, wherein said second sound pick-up device has a second microphone array containing a plurality of microphones; said second microphone array is a rectangular microphone array has first sides and second sides, and a length of each of said first sides is smaller than or equal to a length of each of said second sides.

9. The acoustic camera according to claim 8, wherein when picking up a far-field sound field in said near-field mode, a lowest sound frequency said acoustic camera can detect satisfies an equation:

$$f_{min} = \frac{c}{D},$$

Wherein D is said length of each of said first sides, and c is velocity of wave (m/s), and $f_{min}$ is said lowest sound frequency (Hz).

10. The acoustic camera according to claim 7, wherein when picking up a far-field sound field in said far-field mode, said second sound pick-up device picks up a sound source of a detected object and outputs a sound field of said sound source to said data-retrieving system; said delay-and-sum module of said data-retrieving system works out a strength of said sound source and outputs said strength to said display module.

11. The acoustic camera according to claim 1, wherein said display module is a display screen.

* * * * *